United States Patent
Kawashima et al.

(10) Patent No.: US 10,480,931 B2
(45) Date of Patent: Nov. 19, 2019

(54) DIMENSION MEASURING APPARATUS, INFORMATION READING APPARATUS HAVING MEASURING FUNCTION, AND DIMENSION MEASURING METHOD

(71) Applicant: OPTOELECTRONICS CO., LTD., Saitama (JP)

(72) Inventors: Yasutake Kawashima, Saitama (JP); Ken Fukuba, Saitama (JP)

(73) Assignee: OPTOELECTRONICS CO., LTD., Saitama (JP)

( * ) Notice: Subject to any disclaimer, the term of this patent is extended or adjusted under 35 U.S.C. 154(b) by 0 days.

(21) Appl. No.: 15/868,214

(22) Filed: Jan. 11, 2018

(65) Prior Publication Data

US 2018/0202797 A1    Jul. 19, 2018

(30) Foreign Application Priority Data

Jan. 13, 2017 (JP) ................ 2017-004514

(51) Int. Cl.
*G01B 11/02* (2006.01)
*G06T 7/62* (2017.01)
(Continued)

(52) U.S. Cl.
CPC .......... *G01B 11/022* (2013.01); *G01B 11/026* (2013.01); *G01S 17/023* (2013.01);
(Continued)

(58) Field of Classification Search
CPC ....... G01B 11/00; G01B 11/02; G01B 11/022; G01B 11/026; G01B 11/0608;
(Continued)

(56) References Cited

U.S. PATENT DOCUMENTS

| | | | |
|---|---|---|---|
| 6,618,496 B1 * | 9/2003 | Tassakos ................ | B25J 19/021 382/152 |
| 7,974,025 B2 * | 7/2011 | Topliss ..................... | G03B 3/10 359/820 |

(Continued)

FOREIGN PATENT DOCUMENTS

| | | |
|---|---|---|
| JP | 2002328008 A | 11/2002 |
| JP | 2010-008352 A | 1/2010 |
| JP | 4473337 B1 | 6/2010 |

*Primary Examiner* — Michael P Stafira
(74) *Attorney, Agent, or Firm* — Brundidge & Stanger, P.C.

(57) ABSTRACT

Provided is a dimension measuring apparatus which measures dimensions of a measurement target object without the need of complicated operations by a user. According to dimension measuring apparatus (100), laser (15) radiates laser beams to form at least two feature points on a measurement target object. Decoder (20) measures a distance from the measurement target object by using reflection light of at least two laser beams reflected on the measurement target object. Imaging sensor (10A) captures an image of the measurement target object to which at least the two laser beams are radiated. Dimension measurement section (30) measures a length of the measurement target object on a line connecting the two feature points on the basis of the distance from the measurement target object, a position of the measurement target object in the image, and positions of the two feature points in the image.

10 Claims, 18 Drawing Sheets

(51) Int. Cl.
*H04N 7/18* (2006.01)
*G01S 17/08* (2006.01)
*G01S 17/02* (2006.01)
*G01S 17/46* (2006.01)
*H04N 5/225* (2006.01)

(52) U.S. Cl.
CPC .............. *G01S 17/08* (2013.01); *G01S 17/46* (2013.01); *G06T 7/62* (2017.01); *H04N 7/185* (2013.01); *H04N 5/2256* (2013.01)

(58) Field of Classification Search
CPC .. G01B 11/2504; G01B 21/042; G01B 11/14; G01B 11/24; G01B 11/25; G01B 11/2513; G01B 2210/58; G01B 3/08; G01B 11/002; G01B 21/045; G01B 11/2441; G01B 11/165; G01B 9/0209; G01B 11/005; G01B 11/007; G01B 11/03; G01B 11/2518; G01B 11/26; G01B 15/00; G01B 21/04; G01B 2290/35; G01B 3/30; G01B 5/012; G01B 9/02; G01B 9/0203; G01B 9/02041; G01B 9/02044; G01B 9/02087; G01J 2005/0077; G01J 2005/0085; G01J 3/453; G01J 5/0025; G01J 5/025; G01J 5/0265; G01J 5/047; G01J 5/12; G01J 5/10; G01J 2003/1213; G01J 2003/2866; G01J 2003/467; G01J 3/02; G01J 3/0208; G01J 3/0218; G01J 3/0229; G01J 3/0232; G01J 3/0262; G01J 3/0264; G01J 3/027; G01J 3/0272; G01J 3/0283; G01J 3/0291; G01J 3/10; G01J 3/28; G01J 3/4406; G01J 3/46; G01N 21/95; G01N 2021/6419; G01N 2021/6441; G01N 2021/8466; G01N 21/6458; G01N 21/85; G01N 33/487; G01N 33/5008; G01N 33/5026; G01N 33/582; G01N 2021/6417; G01N 2021/6423; G01N 2021/6484; G01N 21/274; G01N 21/31; G01N 21/474; G01N 21/645; G01N 21/9515; G01N 2201/0221; G01N 2009/022; G01N 2035/00326; G01N 2035/00495; G01N 21/45; G01N 21/8851; G01N 23/225; G01N 30/02; G01N 33/48; G01N 33/559; G01N 33/566; G01N 33/86; G01N 35/00; G01N 35/0092; G01N 35/02; G01N 9/02; G02B 21/002; G02B 26/101; G02B 26/123; G02B 26/127; G02B 27/0031; G02B 19/0085; G02B 1/08; G02B 21/0056; G02B 21/32; G02B 26/105; G02B 27/283; G02B 5/126; G02B 7/022; G02B 7/28; G02B 7/40; G02B 2027/0138; G02B 21/06; G02B 27/017; G02B 2027/0134; G02B 21/365; G02B 27/286; G02B 13/0025; G02B 13/006; G02B 13/0085; G02B 27/0025; G02B 3/0025; G02B 3/0031; G02B 3/0068; G02B 3/0075; G02B 21/367; G02B 2027/014; G02B 2027/0187; G02B 21/0092; G02B 21/14; G02B 21/16; G02B 21/18; G02B 26/06; G02B 26/10; G02B 27/0093; G02B 27/48; G02B 27/58; G02B 5/005; G02B 5/02; G02B 7/04; G02B 7/08; G01S 17/89; G01S 17/023; G01S 7/4808; G01S 7/4972; G01S 17/42; G01S 7/4813; G01S 17/66; G01S 7/4811; G01S 7/4815; G01S 7/481; G01S 17/08; G01S 17/88; G01S 17/46; G01S 17/06; G01S 17/10; G01S 3/786; G01S 7/4817; G01S 11/06; G01S 13/865; G01S 13/867; G01S 15/06; G01S 15/8995; G01S 15/931; G01S 17/36; G01S 19/13; G01S 2013/9364; G01S 2015/935; G01S 2015/937; G01S 5/0294; G01S 5/06; G01S 5/14; G01S 7/4816; G01S 7/486; G01S 7/51

See application file for complete search history.

(56) References Cited

U.S. PATENT DOCUMENTS

| | | | |
|---|---|---|---|
| 8,864,035 B2 | 10/2014 | Fukuba | |
| 2004/0008259 A1* | 1/2004 | Gokturk | G01B 11/2509 348/207.1 |
| 2009/0039167 A1* | 2/2009 | Wang | G01B 11/02 235/462.42 |
| 2013/0308013 A1* | 11/2013 | Li | G01S 17/89 348/231.3 |
| 2014/0028837 A1* | 1/2014 | Gao | H04N 7/18 348/136 |
| 2014/0104413 A1* | 4/2014 | McCloskey | G06Q 10/083 348/135 |
| 2015/0187091 A1* | 7/2015 | Hata | G01B 11/02 382/101 |
| 2016/0245644 A1* | 8/2016 | Yamamoto | G01B 11/24 |
| 2018/0051982 A1* | 2/2018 | Yin | G01B 11/03 |
| 2018/0101963 A1* | 4/2018 | Okawa | G01B 9/02041 |

* cited by examiner

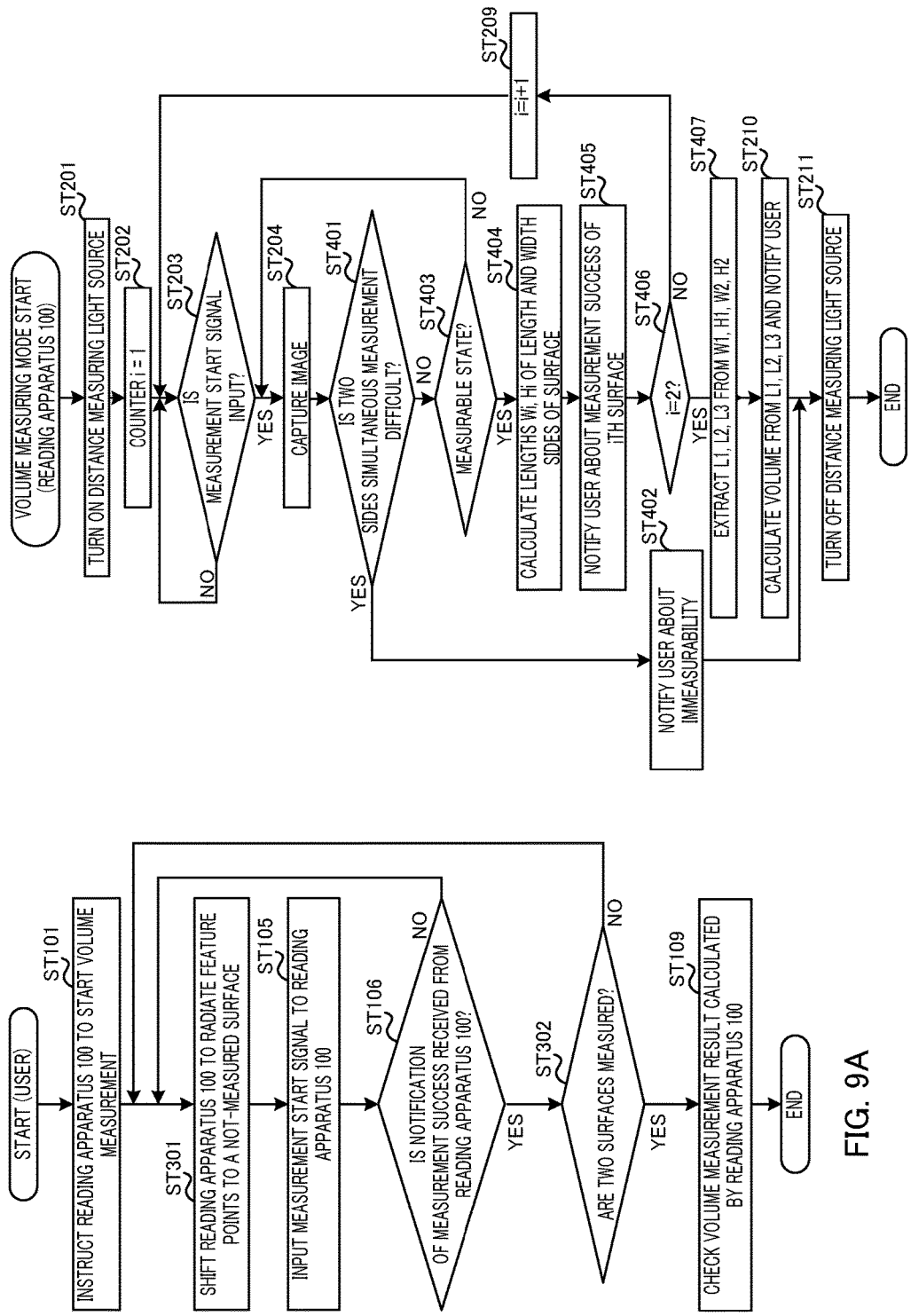

DIMENSION MEASURING APPARATUS, INFORMATION READING APPARATUS HAVING MEASURING FUNCTION, AND DIMENSION MEASURING METHOD

CROSS REFERENCE TO RELATED APPLICATIONS

Japanese Patent Application No. 2017-004514 filed on Jan. 13, 2017, including description, claims, drawings, and abstract the entire disclosure is incorporated herein by reference in its entirety.

TECHNOLOGICAL FIELD

The present invention relates to a dimension measuring apparatus, an information reading apparatus having a measuring function, and a dimension measuring method.

BACKGROUND ART

For providing services such as postal service and home-delivery service, dimensions (length, width, and height) of packages, cardboard boxes each containing a package, or others need to be measured to determine a charge classification.

Japanese Patent Application Laid-Open No. 2010-8352 discloses a method for measuring dimensions of a measurement target object such as a package. This method establishes a reference scale defining a reference of lengths (i.e., known lengths) on a surface of the measurement target object beforehand, captures an image containing the measurement target object for which the reference scale has been established, and calculates dimensions of the measurement target object on the basis of a relative positional relationship between the reference scale and the measurement target object in the image.

CITATION LIST

Patent Literature

PTL 1
Japanese Patent Application Laid-Open No. 2010-8352

SUMMARY OF INVENTION

Technical Problem

According to Japanese Patent Application Laid-Open No. 2010-8352, however, the reference scale needs to be established on the surface of the target object beforehand for every dimension measurement. In this case, a user is required to perform complicated operations.

An object of the present invention is to provide a dimension measuring apparatus, an information reading apparatus having a measuring function, and a dimension measuring method capable of measuring dimensions of a measurement target object without the need of complicated operations by a user.

Solution to Problem

A dimension measuring apparatus according to an aspect of the present invention includes: a radiation section that radiates a laser beam to form at least two feature points on a measurement target object; a distance measurement section that measures a distance from the measurement target object by using reflection light of the laser beam reflected on the measurement target object; an imaging section that captures an image of the measurement target object to which the laser beam is radiated; and a dimension measurement section that measures a length of the measurement target object on a line connecting the at least two feature points based on the distance from the measurement target object, a position of the measurement target object in the image, and positions of the at least two feature points in the image.

An information reading apparatus having a measuring function according to an aspect of the present invention includes: a radiation section that applies a laser beam to an object; a distance measurement section that measures a distance from the object by using reflection light of the laser beam reflected on the object; an imaging section that captures an image of the object to which the laser beam is radiated, while adjusting a focus in accordance with the distance from the object; a reading section that analyzes the image to read information provided on the object; and a dimension measurement section that measures a length of the object based on the image and the distance from the object.

A dimension measuring method according to an aspect of the present invention includes: radiating a laser beam to form at least two feature points on a measurement target object; measuring a distance from the measurement target object by using reflection light of the laser beam reflected on the measurement target object; capturing an image of the measurement target object to which the laser beam is radiated; and measuring a length of the measurement target object on a line connecting the at least two feature points based on the distance from the measurement target object, a position of the measurement target object in the image, and positions of the at least two feature points in the image.

Advantageous Effects of Invention

According to the present invention, measurement of dimensions of a measurement target object is achievable without the need of complicated operations by a user.

BRIEF DESCRIPTION OF DRAWINGS

FIG. 9A is a flowchart illustrating a flow of a dimension measuring operation performed by a user according to Embodiment 2;

FIG. 9B is a flowchart illustrating a flow of a dimension measuring operation performed by a reading apparatus according to Embodiment 2;

DESCRIPTION OF EMBODIMENTS

Embodiments according to the present disclosure are hereinafter described in detail with reference to the drawings.

(Embodiment 1)

[Configuration of Reading Apparatus]

Figure 1:
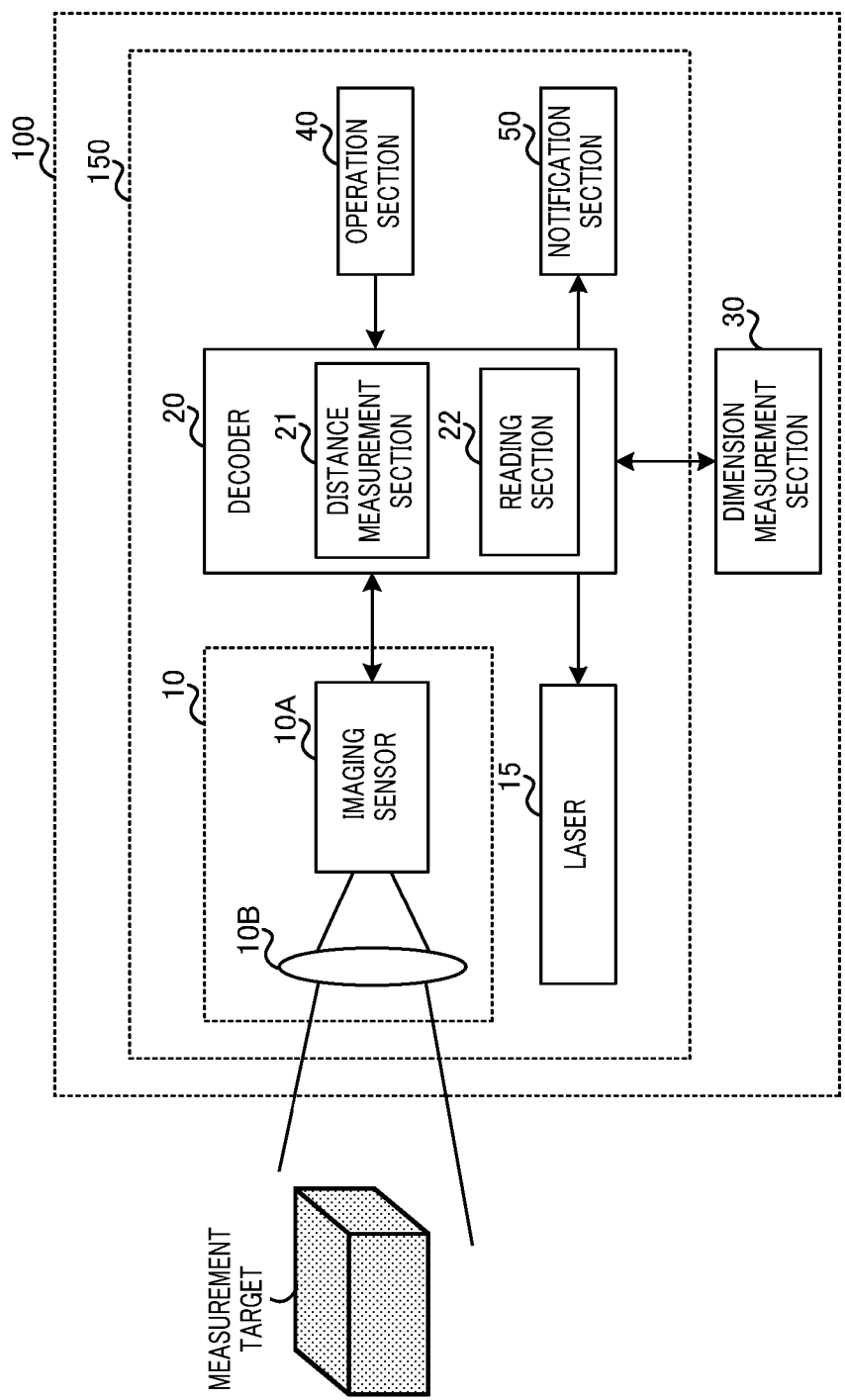
FIG. 1 is a block diagram illustrating a configuration example of a reading apparatus according to Embodiment 1.

FIG. 1 is a block diagram illustrating a configuration of information reading apparatus 100 having a measuring function (hereinafter abbreviated as "reading apparatus") according to the present embodiment. Reading apparatus 100 illustrated in FIG. 1 includes imaging section 10, laser 15 (corresponding to radiation section), decoder 20, dimension measurement section 30, operation section 40, and notification section 50.

For example, each of imaging section 10, decoder 20, operation section 40, and notification section 50 included in reading apparatus 100 functions as a component of information reading section (such as bar code reader) 150 for reading code symbols such as bar codes and two-dimensional codes. In other words, reading apparatus 100 is an apparatus performing both a dimension measuring process and an information reading process. For example, information reading section 150 captures an image of code symbols provided on a reading target object by using imaging section 10 (imaging sensor 10A) to generate image data, and analyses the generated image data to read the code symbols (information) provided on the reading target object.

Imaging section 10 includes imaging sensor 10A and lens 10B.

Imaging sensor 10A captures an image of a measurement target object. For example, imaging sensor 10A is constituted by a complementary metal oxide semiconductor (CMOS) image sensor or the like, and converts an optical signal into an electric signal to capture an image of the measurement target object. Imaging sensor 10A outputs image data indicating the captured image to decoder 20.

Lens 10B is an optical system provided to form an image of reflection light on imaging sensor 10A, as an image of light reflected from the measurement target object. Lens 10B may be constituted by either a single lens, or a plurality of lenses. In addition, lens 10B may be a focus-adjustable lens. More specifically, imaging section 10 may capture an image by using imaging sensor 10A while adjusting a focus of lens 10B in accordance with a distance between reading apparatus 100 and a reading target object as a distance measured by distance measurement section 21 described below.

Laser 15 functions as a distance measuring laser for measuring a distance between the measurement target object and reading apparatus 100. For example, laser 15 is configured to radiate laser beams to the measurement target object to allow the laser beams to enter imaging sensor 10A as reflection light reflected from the measurement target object.

In this case, a position of a spot (hereinafter referred to as "feature point", or also referred to as distance measurement point) formed on the measurement target object when the laser beams are radiated to the measurement target object from laser 15 varies in accordance with the distance between reading apparatus 100 and the measurement target object, and appears as a position of reflection light having entered imaging sensor 10A.

Laser 15 may be used to form a guide mark on a reading target object (not shown) as a mark indicating a readable range or a center position of a reading range for information reading section 150.

Decoder 20 controls focus adjustment, imaging, and other processing performed by imaging section 10, and controls decoding of image data output from imaging section 10.

For example, decoder 20 includes at least distance measurement section 21 and reading section 22.

Laser beams radiated from laser 15 reflect on the measurement target object. Distance measurement section 21 of decoder 20 measures the position of this reflection light on imaging sensor 10A to measure the distance between reading apparatus 100 and the measurement target object. Thereafter, distance measurement section 21 outputs information indicating the measured distance from the measurement target object to imaging section 10 and dimension measurement section 30.

Reading section 22 of decoder 20 analyzes a captured image on the basis of the distance from the measurement target object to read information (e.g., code symbols) provided on the reading target object.

Decoder 20 also outputs, to dimension measurement section 30, a captured image of the measurement target object to which laser beams are radiated from laser 15 (i.e., image containing two feature points).

Dimension measurement section 30 specifies the position (pixel position) of the measurement target object within the captured image input from decoder 20, and the positions of the feature points within the captured image. Thereafter, dimension measurement section 30 measures a length of the measurement target object on a line connecting the two feature points within the captured image on the basis of the distance from the measurement target object, the position of the measurement target object within the captured image, and the positions of the two feature points within the captured image as input from decoder 20. A dimension measuring method performed by dimension measurement section 30 will be detailed below.

For example, dimension measurement section 30 performs the foregoing measuring process for three sides of a rectangular parallelepiped (including cube) measurement target object to measure dimensions (length, width, and height, or volume) of the measurement target object.

Operation section 40 is constituted by buttons or triggers for receiving operations from a user. Operation section 40 outputs information indicating operations received from the user (e.g., dimension measurement start instruction, or information reading start instruction) to decoder 20.

Notification section 50 issues to the user various types of notifications, such as a dimension measurement result obtained by reading apparatus 100, and a reading result obtained by information reading section 150. For example, notification section 50 may notify the user by providing messages or data from a display, lighting or blinking a lamp, or outputting sounds from a speaker. The method for notifying the user by notification section 50 is not limited to these specific methods.

For example, the function blocks such as decoder 20 and dimension measurement section 30 included in reading apparatus 100 may be achieved by a central processing unit (CPU), a read only memory (ROM) storing programs executed by the CPU or data such as various types of tables, and a random access memory (RAM) provided as a working space used when executing various types of processes by the CPU. The CPU controls overall operations of reading apparatus 100. Each of the CPU, ROM, and RAM may be constituted by an application specific integrated circuit (ASIC), a flash ROM (FROM), or a synchronous dynamic random access memory (SDRAM), for example. The ASIC may be constituted by a combination of a CPU and a large scale integrated circuit (LSI) such as a field programmable gate array (FPGA).

Reading apparatus 100 may further include a communication interface used for communicating with an external apparatus outside reading apparatus 100.

[Operation of Reading Apparatus 100]

In a following specific example, reading apparatus 100 (dimension measurement section 30) calculates dimensions of a measurement target object on the basis of positions of two feature points formed by laser 15 on the measurement target object in an imaging plane of imaging sensor 10A, and positions of ends of the measurement target object on a line connecting the two feature points in the imaging plane of imaging sensor 10A.

Figure 2:
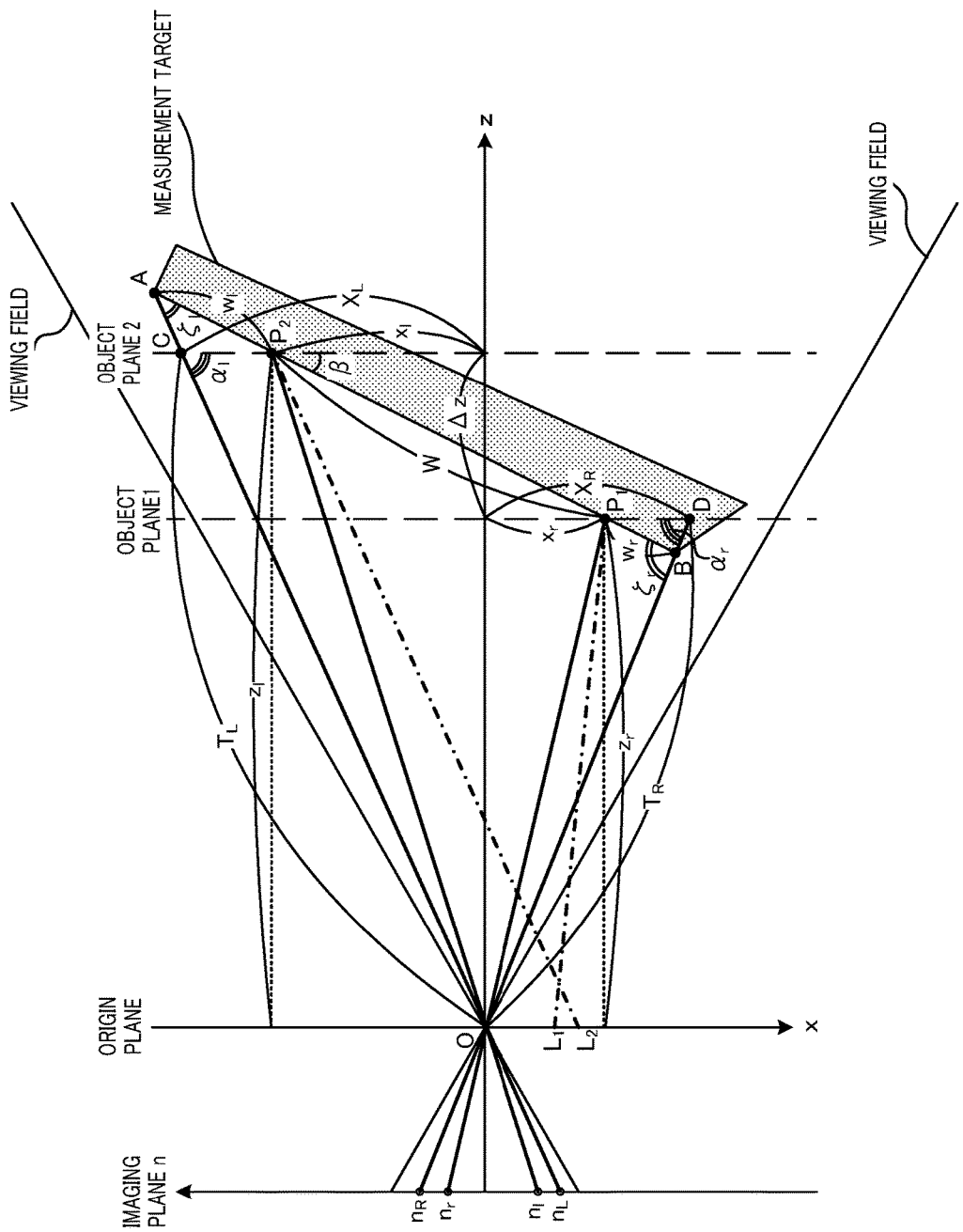
FIG. 2 is a diagram illustrating a method for calculating a distance on a line connecting two feature points.

FIG. 2 illustrates a method for calculating a length (length of line segment A-B) of the measurement target object in an x-z plane on the basis of feature points $P_1$ and $P_2$ on the measurement target object, as points formed by laser 15 including two light sources ($L_1$, $L_2$), and on the basis of positions A and B of the measurement target object on a line connecting $P_1$ and $P_2$.

It is assumed in FIG. 2 that a principal point of lens 10B is origin O, and that a plane perpendicular to imaging optical axis z and containing origin O is an "origin plane". In addition, a plane perpendicular to imaging optical axis z and containing feature point $P_1$ is referred to as "object plane 1", while a plane perpendicular to imaging optical axis z and containing feature point $P_2$ is referred to as "object plane 2".

In FIG. 2, $L_1$ and $L_2$ indicate positions of laser 15 (light sources).

While laser 15 described herein with reference to FIG. 2 includes the two light sources ($L_1$, $L_2$), laser 15 may include only one light source. For example, laser beams may be radiated from one light source such that two or more feature points are formed on the measurement target object by using a special lens or the like. Alternatively, laser 15 may include one light source disposed at an intersection of line segments $L_1$-$P_1$ and $L_2$-$P_2$ illustrated in FIG. 2.

In addition, $z_r$ and $z_l$ indicate distances between the origin plane and object planes 1 and 2 (i.e., positions of feature points $P_1$, $P_2$), respectively, and are obtained by a distance measuring process performed by reading apparatus 100. Moreover, $\Delta z$ indicates a distance ($z_r$-$z_l$) from object plane 2 to object plane 1. Furthermore, $n_r$ and $n_l$ indicate positions of points $P_1$ and $P_2$, respectively, in an imaging plane n reflected in imaging sensor 10A (positions of feature points in captured image) when an image of points $P_1$ and $P_2$ is captured. On the other hand, $n_L$ and $n_R$ indicate positions of points A and B, respectively, in imaging plane n reflected in imaging sensor 10A (positions of measurement target object in captured image) when an image of points A and B is captured.

In addition, $x_r$ and $x_l$ indicate x coordinates of feature points $P_1$ and $P_2$, respectively, $X_R$ indicates an x coordinate of a line connecting point B and the origin at position D in object plane 1, and $X_L$ indicates an x coordinate of a line connecting point A and the origin at position C in object plane 2. For example $x_r$, $x_l$, $X_R$, and $X_L$ are obtained on the basis of distances $z_r$ and $z_l$ of feature points $P_1$ and $P_2$, and positions $n_r$, $n_l$, $n_L$, and $n_R$ in imaging plane n.

Moreover, W indicates a length of line segment $P_1$-$P_2$ in the x-z plane, and is calculated by following equation 1.

[1]

$$W = \sqrt{(x_r - x_l)^2 + (\Delta z)^2} \qquad (1)$$

Furthermore, $w_r$ indicates a length of line segment $P_1$-B in the x-z plane, while $w_l$ indicates a length of line segment $P_2$-A in the x-z plane. These $w_r$ and $w_l$ are calculated by following equations 2 and 3, respectively.

[2]

$$w_r = (n_R - n_r) \frac{z_r W}{(n_r z_r - n_l z_l) - (z_r - z_l) n_R} \qquad (2)$$

[3]

$$w_l = (n_L - n_l) \frac{z_l W}{(n_l z_l - n_r z_r) - (z_l - z_r) n_L} \qquad (3)$$

The length of line segment A-B is calculated by following equation 4.

[4]

$$AB = w_l + W + w_r \qquad (4)$$

As described above, reading apparatus 100 (dimension measurement section 30) measures the actual length (A-B) of the measurement target object on the line connecting two feature points $P_1$ and $P_2$ on the basis of the distances ($z_r$, $z_l$) from the measurement target object obtained by distance measurement using laser 15, the positions ($n_r$, $n_l$) of two feature points $P_1$ and $P_2$ on the measurement target object in the imaging plane, and the positions ($n_L$, $n_R$) of the measurement target object in the imaging plane, as apparent from equations 1 through 4.

Figure 3:
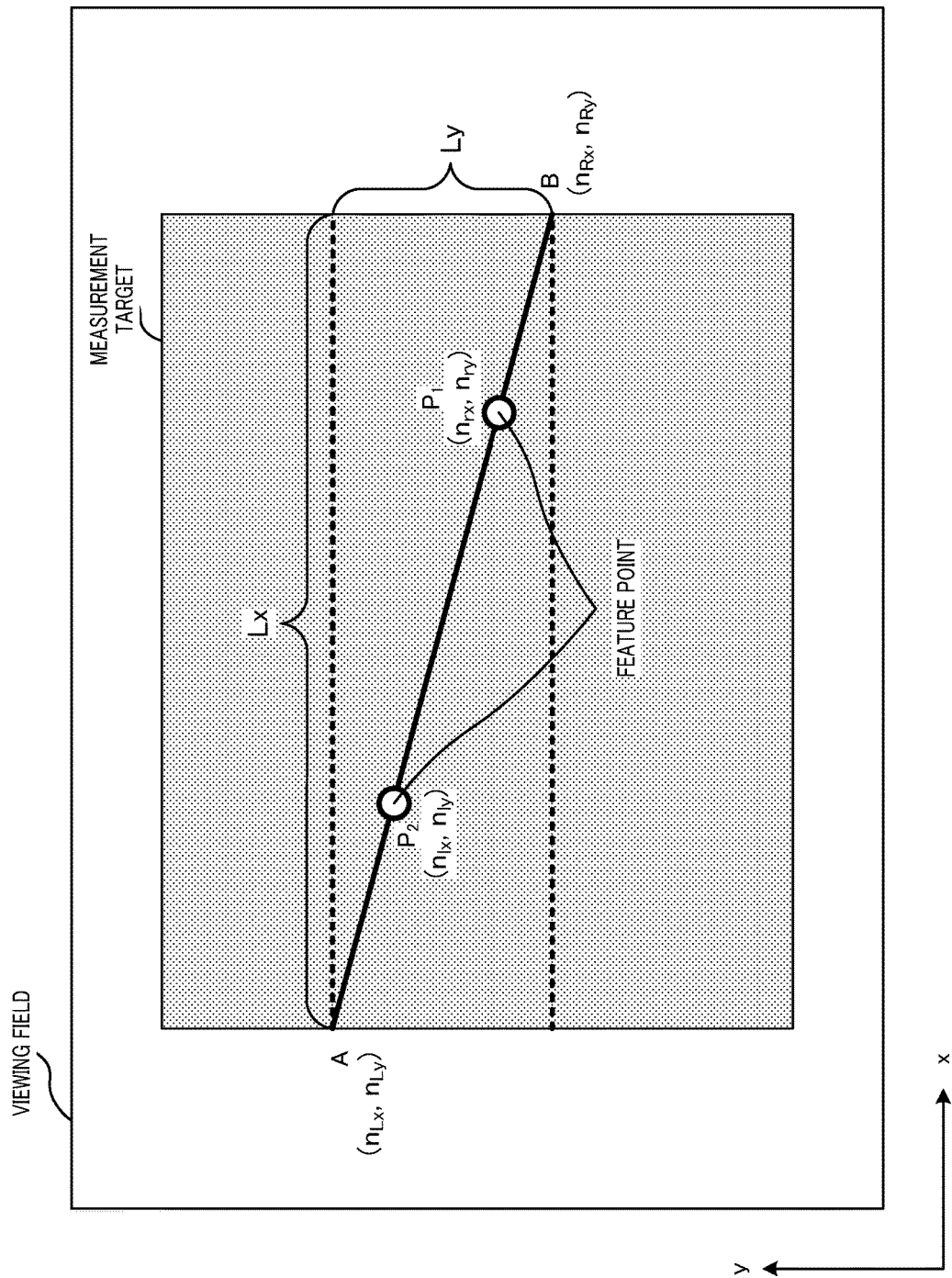
FIG. 3 is a diagram illustrating an example of feature points in a viewing field according to Embodiment 1.

For example, FIG. 3 illustrates a relationship between feature points $P_1$ and $P_2$ and positions A and B of the measurement target object when imaging optical axis z of imaging sensor 10A of reading apparatus 100 is directed perpendicularly to one surface (x-y plane) of the measurement target object (e.g., rectangular parallelepiped). It is assumed in FIG. 3 that distances between feature points $P_1$ and $P_2$ and laser 15 (light sources) are $z_r$ and $z_l$, respectively.

In this case, reading apparatus 100 is only required to be disposed such that two feature points $P_1$ and $P_2$ are contained in the surface (x-y plane) of the object perpendicular to imaging optical axis z in a viewing field of imaging sensor 10A (i.e., captured image) as illustrated in FIG. 3.

Reading apparatus 100 in FIG. 3 measures an actual length ($L_x$) of the measurement target object on the line connecting two feature points $P_1$ and $P_2$ in an x-axis direction on the basis of the distances ($z_r$, $z_l$) from the measurement target object, the positions ($n_{rx}$, $n_{lx}$) of two feature points $P_1$ and $P_2$ in the imaging plane, and the positions ($n_{Lx}$, $n_{Rx}$) of the measurement target object in the imaging plane. Similarly, reading apparatus 100 measures an actual length ($L_y$) of the measurement target object on the line connecting two feature points $P_1$ and $P_2$ in a y-axis direction on the basis of the distances ($z_r$, $z_l$) from the measurement target object, the positions ($n_{ry}$, $n_{ly}$) of two feature points $P_1$ and $P_2$ in the imaging plane, and the positions ($n_{Ly}$, $n_{Ry}$) of the measurement target object in the imaging plane.

Thereafter, reading apparatus 100 in FIG. 3 calculates the length (A-B) of the measurement target object on the line connecting two feature points $P_1$ and $P_2$ by using following equation 5, for example.

[5]
$$AB=\sqrt{L_x^2+L_y^2} \quad (5)$$

FIG. 3 illustrates such a case in which the sides of the viewing field of imaging sensor 10A and the sides of the measurement target object are parallel with each other. In this case, the lengths ($L_x$, $L_y$) in the x-axis and y-axis directions calculated by reading apparatus 100 agree with the lengths of the measurement target object in the x-axis and y-axis directions as described above. Accordingly, reading apparatus 100 is only required to be disposed such that the line connecting the two feature points in the captured image, and the sides of the measurement target object become parallel with each other, for example (e.g., see FIGS. 4A and 4B).

Figure 4A:
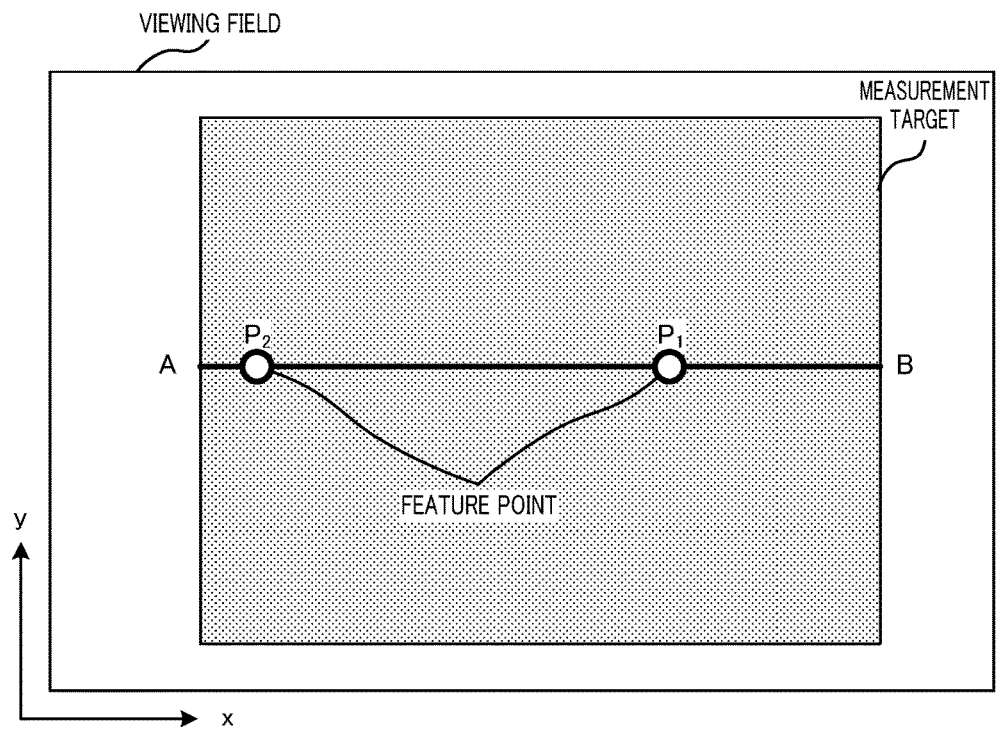
FIG. 4A is a diagram illustrating a disposing example of the feature points in the viewing field according to Embodiment 1.
Figure 4B:
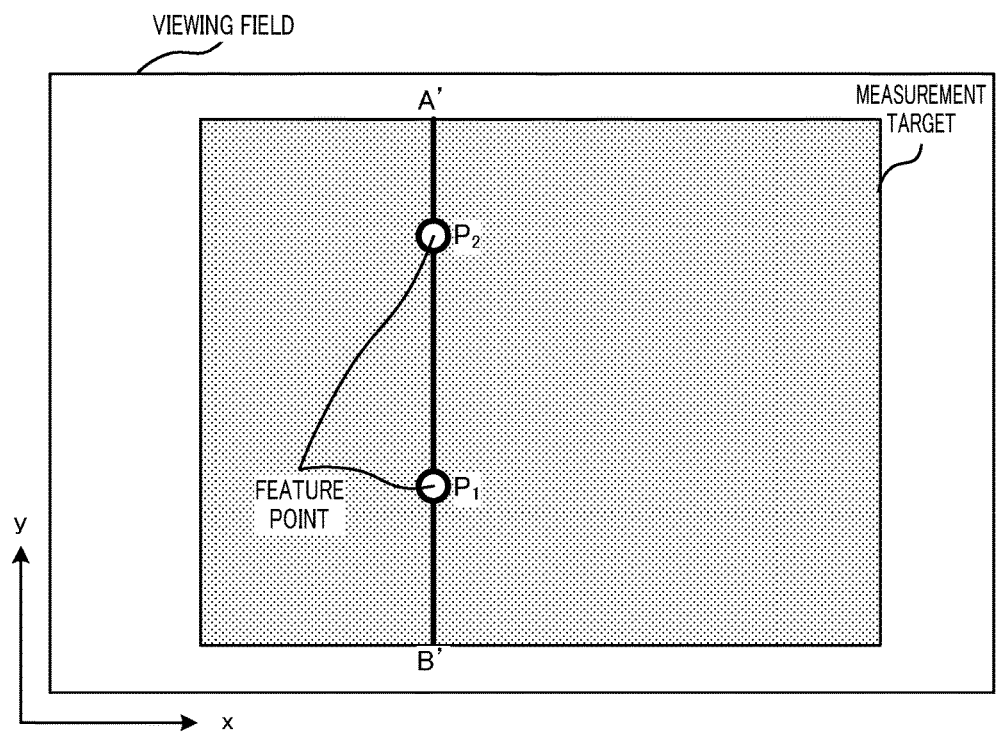
FIG. 4B is a diagram illustrating a disposing example of the feature points in the viewing field according to Embodiment 1.

FIGS. 4A and 4B illustrate other relationships between feature points $P_1$ and $P_2$ and positions A and B of the measurement target object when imaging optical axis z of imaging sensor 10A of reading apparatus 100 is directed perpendicularly to one surface (x-y plane) of the measurement target object (e.g., rectangular parallelepiped).

As illustrated in FIGS. 4A and 4B, reading apparatus 100 may be disposed such that one side of the measurement target object in the viewing field and the line connecting two feature points $P_1$ and $P_2$ on the measurement target object become parallel with each other when the length of line segment A-B is measured.

Reading apparatus 100 in FIG. 4A measures the length of A-B by performing the foregoing dimension measuring process in a state that the side of the measurement target object in the x direction and the line connecting two feature points $P_1$ and $P_2$ are parallel with each other. Similarly, reading apparatus 100 in FIG. 4B measures a length of A'-B' by performing the foregoing dimension measuring process in a state that the side of the measurement target object in the y direction and the line connecting two feature points $P_1$ and $P_2$ are parallel with each other.

In other words, two feature points $P_1$ and $P_2$ are established in FIGS. 4A and 4B such that the side of the viewing field of imaging sensor 10A and the line connecting two feature points $P_1$ and $P_2$ become parallel with each other. In this case, the user operating reading apparatus 100 can easily position the line connecting two feature points $P_1$ and $P_2$ and the side of the measurement target object in parallel with each other. More specifically, the user of reading apparatus 100 is only required to adjust the positions of two feature points $P_1$ and $P_2$ on the measurement target object such that the side of the measurement target object and the side of the viewing field of imaging sensor 10A (e.g., horizontal line of reading apparatus 100) become parallel with each other. This adjustment allows reading apparatus 100 to equalize the length calculated on the basis of two feature points $P_1$ and $P_2$ with the length of the side of the measurement target object.

Reading apparatus 100 measures each of the lengths of the three sides (length, width, and height) of the rectangular parallelepiped corresponding to the measurement target object in a manner similar to the manner illustrated in FIGS. 4A and 4B, and calculates the volume (length×width×height) of the rectangular parallelepiped from the lengths of the three sides.

Figure 5:
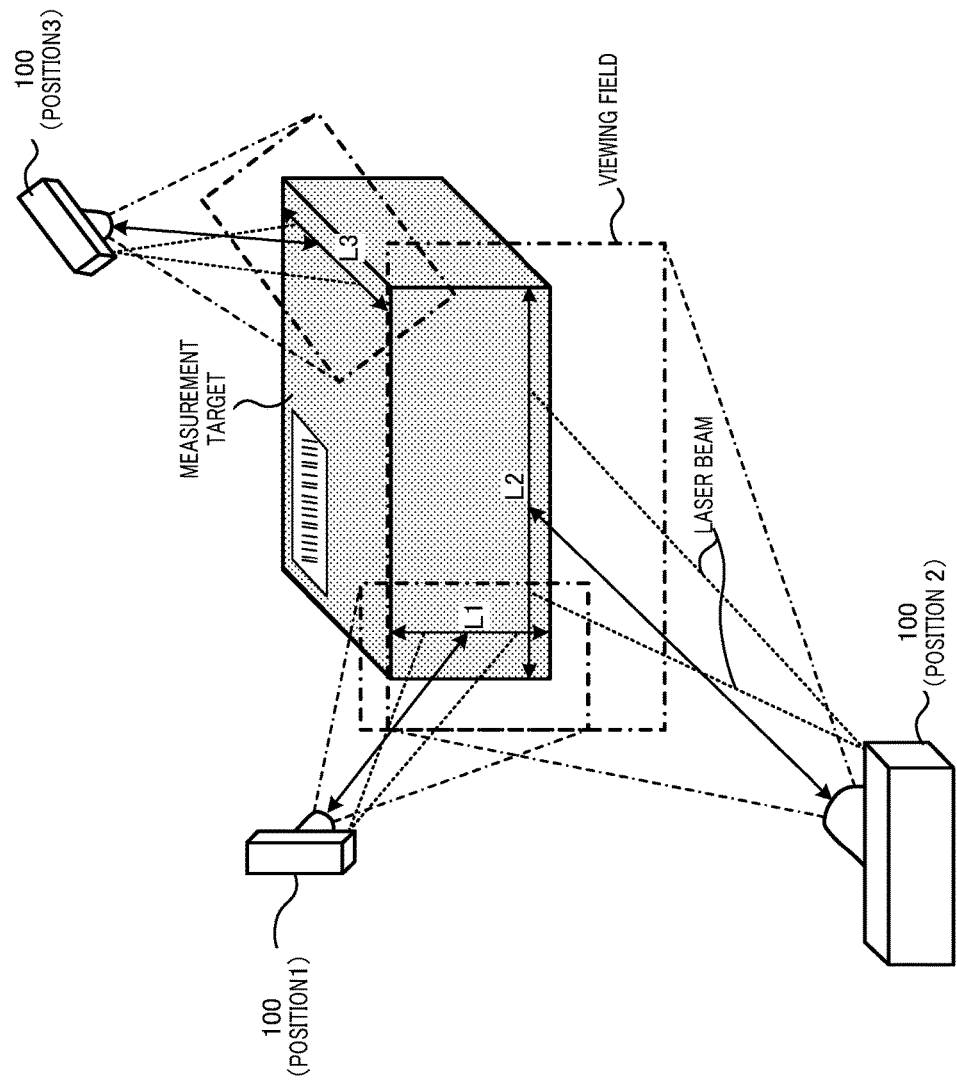
FIG. 5 is a view illustrating an example of a process for measuring a volume of a measurement target object according to Embodiment 1.

FIG. 5 is a view illustrating an operation performed by reading apparatus 100 for measuring a volume of a measurement target object (rectangular parallelepiped). In FIG. 5, the viewing field of imaging sensor 10A of reading apparatus 100 is represented by chain lines, while laser beams are represented by dotted lines.

As illustrated in FIG. 5, reading apparatus 100 obtains height L1 of the rectangular parallelepiped at position 1. In this case, position 1 corresponds to a position of reading apparatus 100 disposed such that two feature points of laser 15 are located on the surface corresponding to the measurement target, and that the line connecting the two feature points becomes parallel with the height (side corresponding to length L1) of the measurement target.

Similarly, reading apparatus 100 is disposed at other points 2 and 3 to measure lengths L2 and L3 of other sides of the rectangular parallelepiped, respectively, as illustrated in FIG. 5.

Thereafter, reading apparatus 100 calculates a volume V (=L1×L2×L3) from lengths L1, L2, and L3 of the three sides.

For example, reading apparatus 100 may determine whether or not one side of the measurement target object is parallel with the line connecting two points of feature points $P_1$ and $P_2$ on the measurement target object in the viewing field in the imaging plane of imaging sensor 10A. In this case, reading apparatus 100 may be so controlled as to measure the length of the one side (length of measurement target object on line connecting two feature points $P_1$ and $P_2$) when the one side is parallel with the line, or not to measure the length of the one side when the one side is not parallel with the line. This control allows reading apparatus 100 to measure dimensions of the measurement target object while reducing measurement errors.

In this case, notification section 50 may notify the user about a result of determination of whether or not the one side of the measurement target object is parallel with the line connecting two feature points $P_1$ and $P_2$ of the measurement target object to urge the user to adjust the state of the installation position (direction) of reading apparatus 100 into a dimension measurable state (parallel state).

Described next is an example of an operation performed by reading apparatus 100, and an operation performed by the user operating reading apparatus 100.

Figures 6A, 6B:
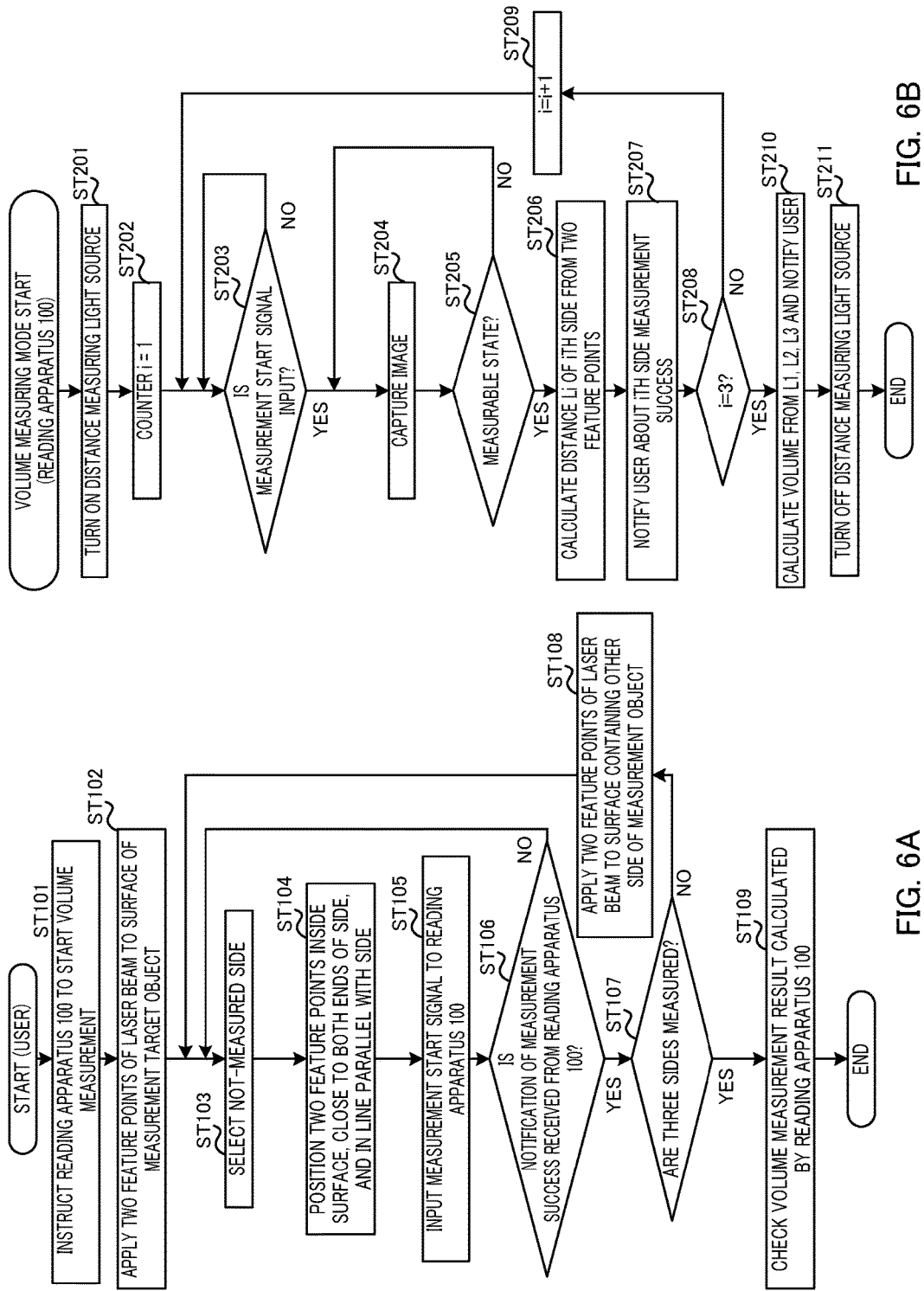
FIG. 6A is a flowchart illustrating a flow of a dimension measuring operation performed by a user according to Embodiment 1.
FIG. 6B is a flowchart illustrating a flow of a dimension measuring operation performed by the reading apparatus according to Embodiment 1.

FIG. 6A is a flowchart illustrating a flow of the operation performed by the user operating reading apparatus 100, while FIG. 6B is a flowchart illustrating a flow of the operation of reading apparatus 100 operated by the user illustrated in FIG. 6A.

The user in FIG. 6A instructs reading apparatus 100, via operation section 40, to start volume measurement (ST 101). In response to this instruction, reading apparatus 100 starts a volume measuring mode illustrated in FIG. 6B.

Reading apparatus 100 turns on a distance measuring light sources of laser 15 (ST 201). Reading apparatus 100 also sets counter i to an initial value of 1 (ST 202). Reading apparatus 100 determines whether or not a side measurement start signal has been input (ST 203). When no measurement start signal is input (ST 203: NO), reading apparatus 100 waits for this input.

When the distance measuring light sources are turned on, the user applies two feature points to one surface of the measurement target object (ST 102). The user also selects a side not measured (not-measured side) from the three sides of the rectangular parallelepiped (ST 103). The user further positions reading apparatus 100 such that the two feature points are located inside the surface of the rectangular parallelepiped and at positions closer to both ends of the side corresponding to the measurement target, and such that a line connecting the two feature points extends parallel with the side (ST 104).

Thereafter, the user instructs reading apparatus 100 to start measuring the side of the measurement target (ST 105). In response to this instruction, a measurement start signal is input to the decoder of reading apparatus 100 (ST 203: YES). The measurement start signal may be generated by an operation input from the user to operation section 40 as illustrated in FIG. 6A, or cyclically generated in predetermined timing during the period of the volume measuring mode.

The user determines whether or not a notification about a measurement success has been received from reading apparatus 100 (ST 106). When it is determined that no notification of a measurement success has been received (ST 106: NO), the user may return to ST 103 through ST 105 to maintain or change the state of the two feature points.

When it is determined that the measurement start signal has been input (ST 203: YES), reading apparatus 100 captures an image containing the measurement target object by using imaging sensor 10A (ST 204).

Thereafter, reading apparatus 100 determines whether or not the positions of the measurement target object and the feature points in the captured image (imaging plane) are measurable state positions (ST 205). For example, reading apparatus 100 determines the respective positions are the measurable state positions when the captured image contains all of (1) the whole one side (not measured side) of the surface (rectangular shape) of the measurement target object, (2) the two feature points inside the rectangular shape, and (3) the intersection of the line connecting the two feature points and the side of the rectangular shape.

When it is determined that the respective positions are not the measurable state positions (ST 205: NO), reading apparatus 100 returns to the imaging process in ST 204. In this case, reading apparatus 100 may issue a notification to the user to urge the user to bring reading apparatus 100 into the measurable state position in ST 205 (e.g., notification of result of determination of whether or not reading apparatus 100 is in measurable state position), as described above. This notification prevents lowering of measurement accuracy by urging the user to bring reading apparatus 100 into the measurable state position even when the user instructs reading apparatus 100 to start measurement in ST 105 without correct establishment of the two feature points in ST 104.

When the respective positions are the measurable state positions (ST 205: YES), reading apparatus 100 calculates a length (distance Li) of an i-th side of the measurement target object on the basis of the two feature points as described above (ST 206). Thereafter, reading apparatus 100 notifies the user about a measurement success of the i-th side via notification section 50 (ST 207). Reading apparatus 100 also determines whether or not counter i indicates 3 (i.e., whether or not measurement of three sides is completed) (ST 208). When counter i does not indicate 3 (ST 208: NO), reading apparatus 100 increments counter i (i=i+1), and waits for input of a measurement start signal in ST 203 (ST 209).

When the user receives a notification of a measurement success (ST 106: YES), it is determined whether or not measurement of all the three sides of the measurement target object have been completed (ST 107). When measurement of all the three sides is not completed (ST 107: NO), the user applies the two feature points of the laser beams from laser 15 to a surface containing another not-measured side of the measurement target object (ST 108).

The lengths of the three sides of the measurement target object (distances L1, L2, L3) are measured by processing from ST 103 to ST 107 performed by the user, and processing from ST 203 to ST 209 performed by reading apparatus 100.

After measurement of the lengths of the three sides (ST 107, ST 208: YES), reading apparatus 100 calculates volume V from L1, L2, and L3, and notifies the user about a result of the volume measurement (ST 210). The user checks the result of the volume measurement issued from reading apparatus 100 (ST 109).

Thereafter, reading apparatus 100 turns off the distance measuring light sources of laser 15 (ST 211) to end the volume measuring mode.

Description of the measuring operation performed by reading apparatus 100 is now completed.

Reading apparatus 100 captures an image of a measurement target object to which laser beams are radiated such that at least two feature points are formed on the measurement target object, and measures dimensions of the measurement target object on the basis of the positions of the radiation points (feature points) on the measurement target object in the captured image, the position of the measurement target object in the captured image, and the distance from the measurement target object obtained by distance measurement.

In other words, reading apparatus 100 directly measures dimensions of the measurement target object by performing the distance measuring process using laser beams radiated from laser 15, and the imaging process performed by imaging sensor 10A. In this case, the user can measure dimensions of the measurement target object only by bringing reading apparatus 100 into a measurable state for measurement of the measurement target object. Accordingly, operations performed by the user are facilitated according to the embodiment in comparison with measurement of the dimensions of the measurement target object by preparing a different object (reference scale) having known dimensions as described in Japanese Patent Application Laid-Open No. 2010-8352.

In addition, as illustrated in FIG. 1, the respective constituent sections of reading apparatus 100 also function as the respective constituent sections of information reading section 150. More specifically, laser 15 in the information reading process is used for distance measurement necessary for focus adjustment of lens 10B during reading. On the other hand, imaging sensor 10A in the information reading process generates image data indicating a captured image of code symbols corresponding to a reading target. Reading apparatus 100 in the information reading process therefore performs both functions for obtaining a distance from code symbols corresponding to a reading target (distance measurement information), and for obtaining an image of code symbols (image information).

Accordingly, reading apparatus 100 is capable of performing the dimension measuring process by using the distance measurement information and the image information available from information reading section 150. In other words, reading apparatus 100 is capable of performing the dimension measuring process by utilizing the configurations included in information reading section 150. In this case, reading apparatus 100 need not have individual configurations each dedicated for executing the information reading process or the dimension measuring process. Accordingly, increase in the size of reading apparatus 100 is avoidable. Moreover, the user is allowed to execute the information reading process and the dimension measuring process by using single reading apparatus 100. For example, the user is allowed to obtain information indicated by code symbols (e.g., barcodes) affixed to a package by using the information reading function of reading apparatus 100, and also allowed to obtain information about dimensions of the package by using the dimension measuring function of reading apparatus 100. In this case, the user need not execute the information reading process and the dimension measuring process by using individual apparatuses each dedicated for the corresponding process.

Accordingly, dimensions of a measurement target object are measurable without the need of performing complicated operations by the user according to the present embodiment.

(Embodiment 2)

A reading apparatus according to the present embodiment has basic configurations similar to the configurations of reading apparatus 100 according to Embodiment 1, wherefore FIG. 1 will be also referred to in the following description.

According to Embodiment 1 described above, reading apparatus 100 measures a dimension (length) for each side of a measurement target object (rectangular parallelepiped). According to Embodiment 2 described herein, however, a dimension (area) is measured for each surface of a measurement target object.

According to the present embodiment, reading apparatus 100 establishes a set of feature points (two feature points) for measuring each side of a measurement target object, i.e., for measuring each of two sides constituting one surface of the measurement target object. More specifically, laser 15 radiates laser beams such that two feature points are simultaneously formed in each of one direction (first direction) within the viewing field of imaging sensor 10A, and a direction (second direction) orthogonal to the first direction. Thereafter, dimension measurement section 30 measures each of a length of the measurement target object on a line connecting the two feature points formed in the first direction, and a length of the measurement target object on a line connecting the two feature points formed in the second direction.

Figure 7:
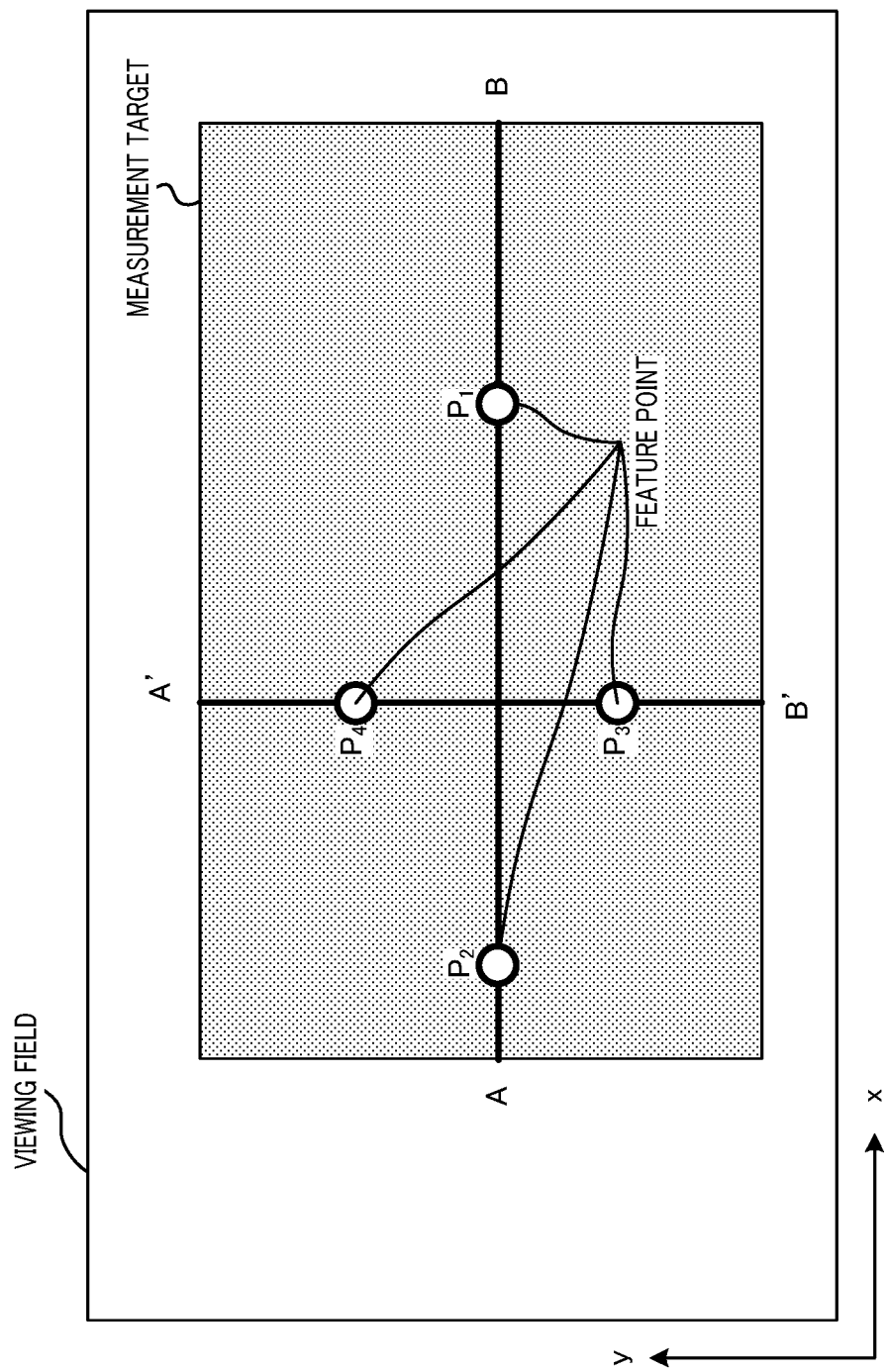
FIG. 7 is a diagram illustrating a disposing example of feature points in a viewing field according to Embodiment 2.

FIG. 7 illustrates a disposing example of feature points in the viewing field of imaging sensor 10A. Laser 15 in FIG. 7 has four light sources (corresponding to two feature points×two sides) for simultaneous measurement of lengths of two sides. The number of the light sources included in laser 15 is not limited to four, but may be other numbers as long as radiated laser beams can form four feature points on the measurement target object. For example, laser 15 may include only a single light source.

As illustrated in FIG. 7, feature points $P_1$ and $P_2$ are feature points used for measuring a length of side A-B of the measurement target object in the x direction. On the other hand, feature points $P_3$ and $P_4$ are feature points used for measuring a length of a side A'-B' of the measurement target object in the y direction. For example, reading apparatus 100 is only required to be positioned such that feature points $P_1$, $P_2$, $P_3$, and $P_4$ are contained in a surface of the measurement target object, and that a line connecting $P_1$ and $P_2$, and a line connecting $P_3$ and $P_4$ become parallel with the side in the x direction and the side in the y direction, respectively. In this case, reading apparatus 100 can simultaneously measure dimensions (area) of the two sides constituting one surface of the measurement target object.

Figure 8:
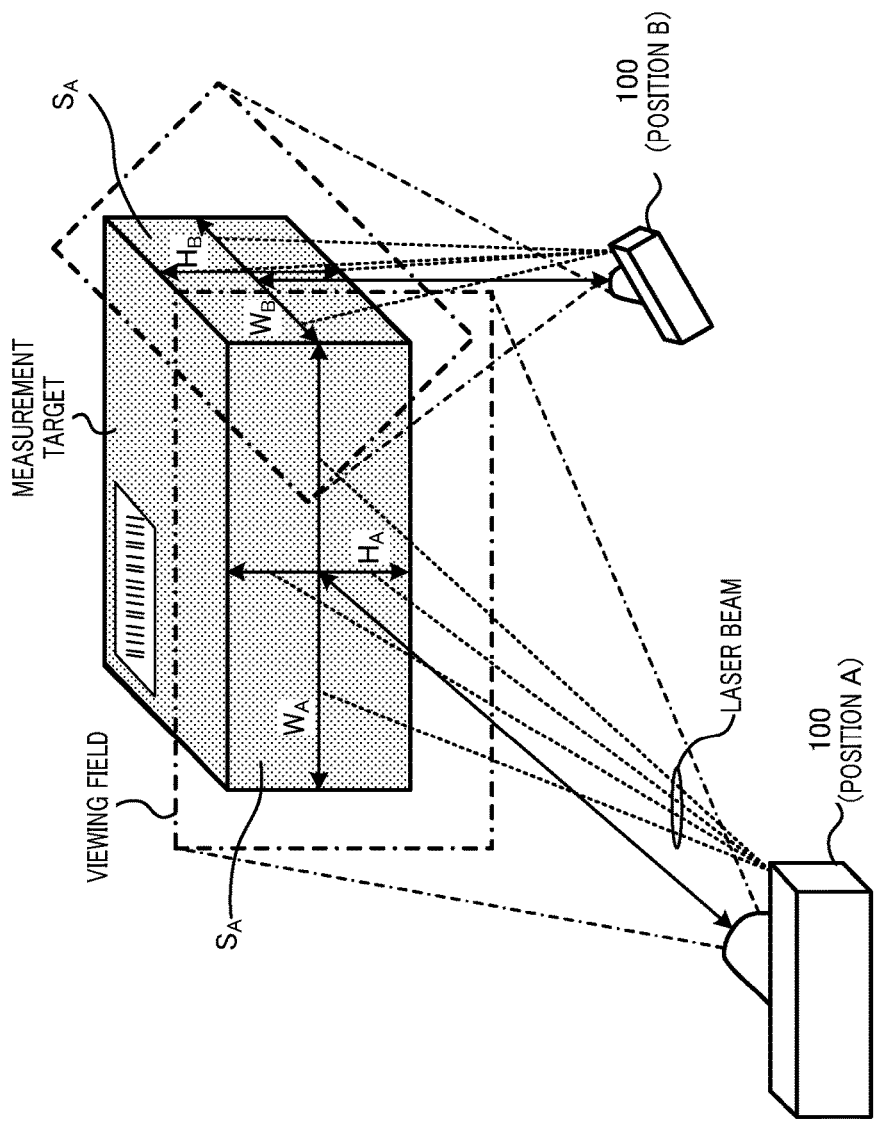
FIG. 8 is a view illustrating an example of a process for measuring a volume of a measurement target object according to Embodiment 2.

FIG. 8 is a view illustrating an operation performed by reading apparatus 100 for measuring a volume of a measurement target object (rectangular parallelepiped). In FIG. 8, the viewing field of imaging sensor 10A of reading apparatus 100 is represented by chain lines, while the laser beams are represented by dotted lines.

As illustrated in FIG. 8, reading apparatus 100 at a position A measures dimensions of height and width ($H_A$, $W_A$) of one surface $S_A$ of the rectangular parallelepiped. In this case, position A is a position of reading apparatus 100 disposed such that the surface corresponding to the measurement target is located perpendicularly to the imaging optical axis of reading apparatus 100, and that the four feature points formed by laser 15 are located in surface $S_A$.

Similarly, reading apparatus 100 at other position B illustrated in FIG. 8 measures dimensions of height and width ($H_B$, $W_B$) of other surface $S_B$ of the rectangular parallelepiped.

In this case, two parameters ($H_A$ and $H_B$ in FIG. 8) of obtained four parameters ($H_A$, $W_A$, $H_B$, $W_B$) indicate the same length of sides of the rectangular parallelepiped. Accordingly, reading apparatus 100 may compare $|W_A-W_B|$, $|W_A-H_B|$, $|H_A-W_B|$, and $|H_A-H_B|$, and determine that a set of parameters producing the minimum difference indicate the same length of sides, for example. This method allows reading apparatus 100 to specify lengths of three sides of the rectangular parallelepiped ($H_A$ (=$H_B$), $W_A$, $W_B$), and calculate volume V (=$H_A \times W_A \times W_B$) of the rectangular parallelepiped from the lengths of the three sides.

As described above, reading apparatus 100 measures lengths in the first and second directions (e.g., lengths in vertical and horizontal directions) of at least two surfaces of the rectangular parallelepiped corresponding to the measurement target object, and calculates the volume of the rectangular parallelepiped from the measured lengths of at least the two surfaces.

Described next is an example of an operation performed by reading apparatus 100, and an operation performed by the user operating reading apparatus 100.

FIG. 9A is a flowchart illustrating a flow of the operation performed by the user operating reading apparatus 100, while FIG. 9B is a flowchart illustrating a flow of the operation performed by reading apparatus 100 operated by the user illustrated in FIG. 9A. Operations in FIGS. 9A and 9B similar to the corresponding operations in Embodiment 1 (FIGS. 6A and 6B) are given identical reference numbers, and the same description of these operations is not repeated.

When the distance measuring light sources are turned on in FIG. 9A, the user shifts reading apparatus 100 to radiate four feature points to a not-measured surface of a measurement target object (ST 301). More specifically, the user positions reading apparatus 100 such that two feature points are located inside each surface of the rectangular parallelepiped and at positions closer to both ends of each side of the surface corresponding to the measurement target, and such that a line connecting the two feature points for measuring a dimension of each side extends in parallel with the corresponding side.

On the other hand, reading apparatus 100 determines whether or not dimensions of two sides constituting the surface present in the image captured in ST 204 (imaging plane) can be simultaneously measured (ST 401). For example, reading apparatus 100 may determine that dimensions of two sides cannot be simultaneously measured when the four feature points are not formed within the captured image (viewing field).

When simultaneous measurement of dimensions of two sides is difficult (ST 401: YES), reading apparatus 100 notifies the user about immeasurability via notification section 50 (ST 402). In this case, the user ends the dimension measuring operation. Alternatively, the user may adjust the position of reading apparatus 100 to bring reading apparatus 100 into a state for allowing simultaneous measurement of dimensions of two sides. For example, the user may shift reading apparatus 100 away from the measurement target object to bring the four feature points into the captured image (viewing field).

When dimensions of two sides are simultaneously measurable (ST 401: NO), reading apparatus 100 determines whether or not the positions of the measurement target object and the feature points in the image captured in ST 204 (imaging plane) are measurable state positions (ST 403). For example, reading apparatus 100 determines (1) whether or not a contour of a surface (rectangular shape) of the measurement target object is extractable from the image (viewing field), and (2) whether or not two feature points for measuring lengths of each side (x direction, y direction) are contained in the extracted contour. When both the conditions (1) and (2) are met, the reading apparatus 100 determines that the current state is a measurable state.

When the current state is not a measurable state (ST 403: NO), reading apparatus 100 returns to the imaging process in ST 204. When the current state is a measurable state (ST 403: YES), reading apparatus 100 calculates the lengths (Wi, Hi) of the length and width sides constituting the i-th surface of the measurement target object on the basis of the four feature points as described above (ST 404). Thereafter, reading apparatus 100 notifies the user about a measurement success of the i-th surface via notification section 50 (ST 405). Reading apparatus 100 further determines whether or not the counter i indicates 2 (i.e., whether or not measurement of two surfaces is completed) (ST 406).

When receiving a notification about a measurement success (ST 106: YES), the user determines whether or not measurement of two surfaces of the measurement target object has been completed (ST 302). When measurement of two surfaces is not completed (ST 302: NO), the user returns to ST 301 to apply the four feature points of laser beams of laser 15 to another not-measured surface of the measurement target object.

When measurement of dimensions of two surfaces is completed (ST 302, ST 406: YES), reading apparatus 100 calculates (extracts) lengths (L1, L2, L3) of three sides of the rectangular parallelepiped on the basis of the dimensions (H1, W1, H2, W2) obtained by measurement of the two surfaces (ST 407).

Description of the measuring operation performed by reading apparatus 100 is now completed.

In this manner, reading apparatus 100 simultaneously measures lengths of two sides constituting each surface of the measurement target object. This manner of measurement reduces operations performed by the user for measuring dimensions (three sides, volume) of a rectangular parallelepiped by using reading apparatus 100. More specifically, while the user performs the measuring process three times (for three sides) according to Embodiment 1 (e.g., FIG. 5), the user is only required to perform the measuring process twice (for two surfaces) in Embodiment 2 (e.g., FIG. 8).

Accordingly, dimensions of a measurement target object are measurable without the need of performing complicated operations by the user according to the present embodiment.

(Modified Examples of Embodiment 2)

Positions of feature points formed by laser 15 within the viewing field according to the present embodiment are not limited to the positions described in the specific example illustrated in FIG. 7. Hereinafter described are other methods adoptable for establishing feature points of laser 15 within the viewing field.

[Disposing Method 1]

Figure 10A:
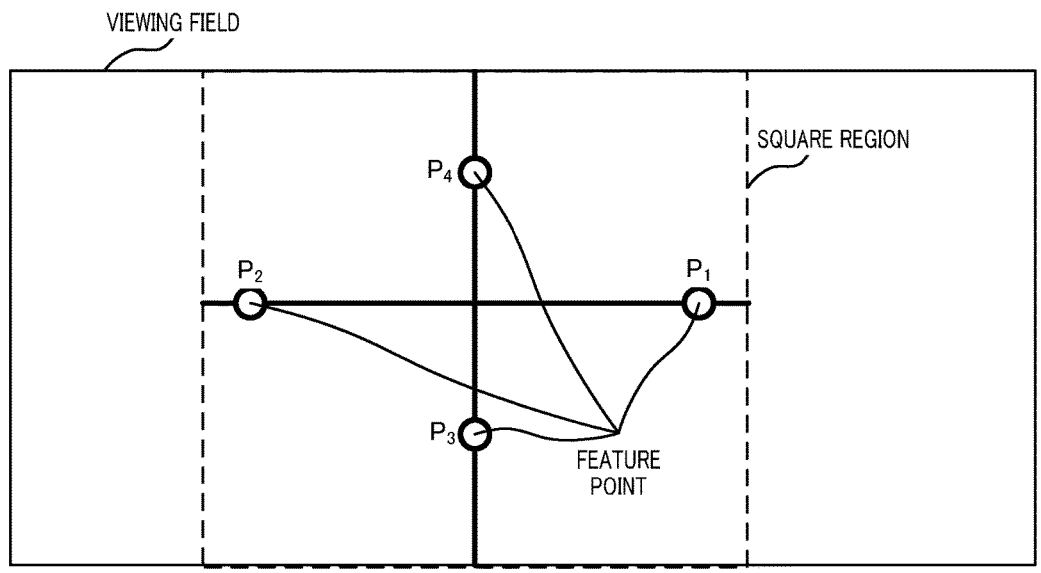
FIG. 10A is a diagram illustrating a disposing example of feature points in a viewing field according to a modified example of Embodiment 2.

According to disposing method 1, four feature points of laser 15 are established within the maximum square region in the viewing field as illustrated in FIG. 10A. All feature points $P_1$ through $P_4$ in FIG. 10A are formed within a square region each side of which has the same length as a length of a short side of the viewing field of imaging sensor 10A (vertical direction in FIG. 10A). In FIG. 10A, a line connecting two horizontal feature points $P_1$ and $P_2$ of the four feature points are parallel with the horizontal sides of the viewing field, while a line connecting two vertical feature points $P_3$ and $P_4$ are parallel with the vertical sides of the viewing field, similarly to the example illustrated in FIG. 7.

Figure 10B:
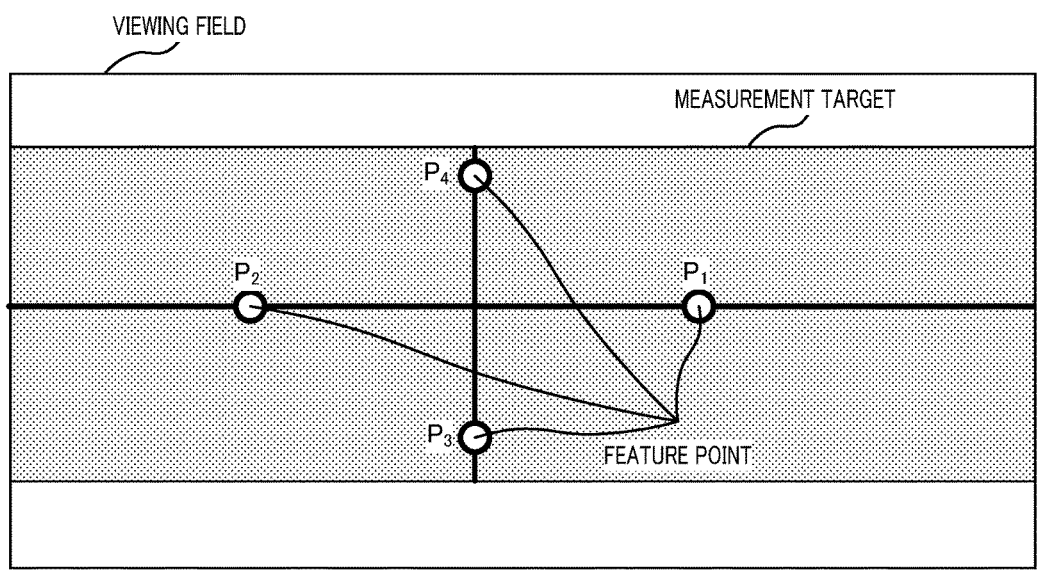
FIG. 10B is a diagram illustrating the disposing example of the feature points in the viewing field according to the modified example of Embodiment 2.

In this case, an aspect ratio of a target measurable in the viewing field of reading apparatus 100 ranges from a ratio of 1:1 similar to a ratio of the square region in FIG. 10A, to an aspect ratio of a region (rectangular shape) having a vertical length corresponding to a length between feature points $P_3$ and $P_4$ (vertical length) and a horizontal length corresponding to a horizontal length of the viewing field as illustrated in FIG. 10B. Accordingly, FIG. 10B illustrates the region of the target having the largest horizontal length in targets measurable by disposing method 1.

According to disposing method 1, the user is only required to adjust the position of reading apparatus 100 such that the measurement target object is in a horizontally long posture, and that feature points $P_3$ and $P_4$ are disposed in the vicinity of upper and lower two sides of the measurement target object within the viewing field in FIG. 10A.

[Disposing Method 2]

Figure 11A:
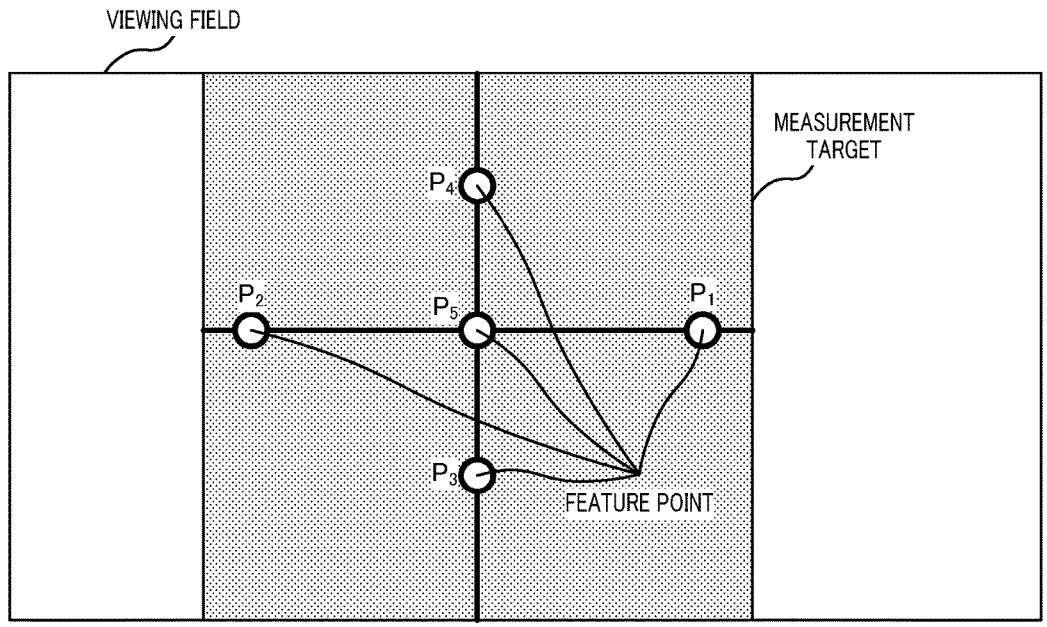
FIG. 11A is a diagram illustrating a disposing example of feature points in a viewing field according to a modified example of Embodiment 2.

According to disposing method 2, five feature points in total are formed in one surface of the measurement target object (including first direction and second direction) as illustrated in FIG. 11A. In this case, all of five feature points $P_1$ through $P_5$ of laser 15 are disposed within the maximum square region in the viewing field, similarly to the example illustrated in FIG. 10A. In FIG. 11A, a line connecting two horizontal feature points $P_1$ and $P_2$ of the four feature points is parallel with the horizontal sides of the viewing field, while a line connecting two vertical feature points $P_3$ and $P_4$ is parallel with the vertical sides of the viewing field, similarly to the example illustrated in FIG. 7.

In FIG. 11A, one feature point $P_5$ of five feature points $P_1$ through $P_5$ is formed at an intersection of the line connecting feature points $P_1$ and $P_2$ formed in the horizontal direction and different from feature point $P_5$, and the line connecting feature points $P_3$ and $P_4$ formed in the vertical direction and different from feature point $P_5$.

Figure 11B:
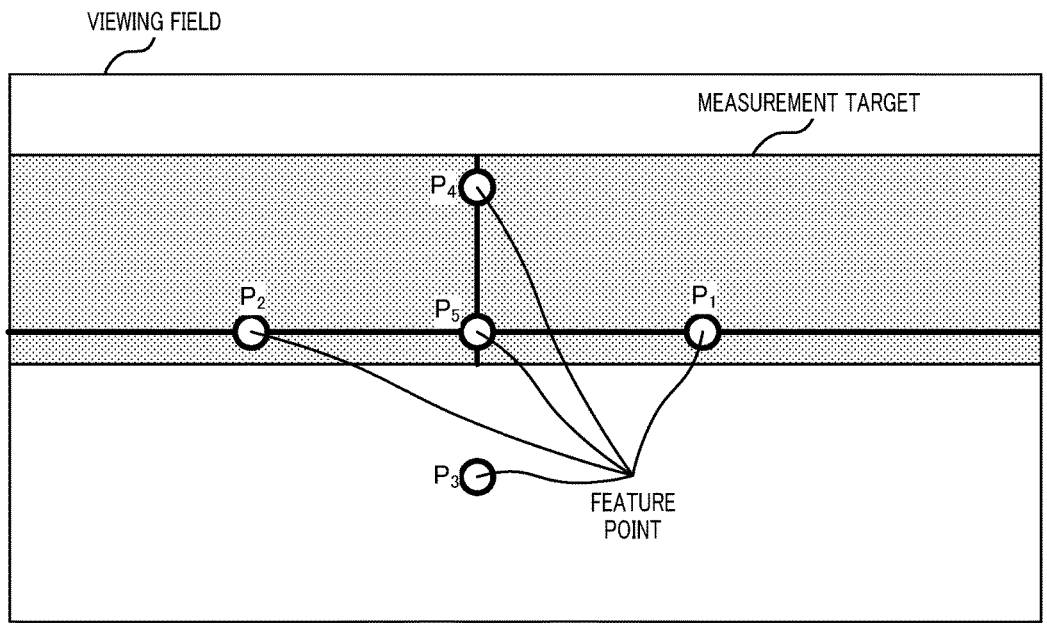
FIG. 11B is a diagram illustrating the disposing example of the feature points in the viewing field according to the modified example of Embodiment 2.

In this case, an aspect ratio of a target measurable within the viewing field of reading apparatus 100 ranges from an aspect ratio (not shown) of a region (rectangular shape) having a vertical length corresponding to a vertical length of the viewing field and a horizontal length corresponding to a length between the adjoining feature points in the horizontal direction ($P_1$ and $P_5$, or $P_2$ and $P_5$) (horizontal length), to an aspect ratio of a region (rectangular shape) having a vertical length corresponding to a length between feature points $P_4$ and $P_5$ (or feature points $P_3$ and $P_5$) (vertical length) and a horizontal length corresponding to a horizontal length of the viewing field as illustrated in FIG. 11B. Accordingly, FIG. 11B illustrates the region of the target having the largest length in the horizontal direction in targets measurable by disposing method 2.

In this case, even when either one of feature points $P_3$ and $P_4$ ($P_3$ in FIG. 11B) is disposed out of the region of the measurement target object in the vertical direction, reading apparatus 100 using disposing method 2 is capable of measuring dimensions on the basis of feature point $P_5$ disposed at the center instead of the feature point disposed out of the region. Accordingly, reading apparatus 100 using disposing method 2 can measure a target which is horizontally longer than a horizontally long target measurable by disposing method 1 (see FIG. 10B).

Similarly, even when either one of feature points $P_1$ and $P_2$ is disposed out of the region of the measurement target object in the horizontal direction, reading apparatus 100 using disposing method 2 is capable of measuring dimensions on the basis of feature point $P_5$ disposed at the center instead of the feature point disposed out of the region. Accordingly, reading apparatus 100 using disposing method 2 can measure a target (not shown) which is vertically longer than a vertical long target measurable by disposing method 1 (square illustrated in FIG. 10A).

According to disposing method 2, the user is only required to adjust the position of reading apparatus 100 such that the measurement target object becomes horizontally long in the viewing field in FIG. 11A, and that adjoining feature points (feature points $P_3$ and $P_5$ or $P_4$ and $P_5$) in the vertical direction are disposed in the vicinity of upper and lower two sides of the measurement target object, for example. In other words, reading apparatus 100 can simultaneously measure lengths of two sides when at least the four feature points (i.e., feature point $P_5$ and any other three feature points) of five feature points $P_1$ through $P_5$ are disposed within the region of the measurement target object.

[Disposing Method 3]

Figure 12:
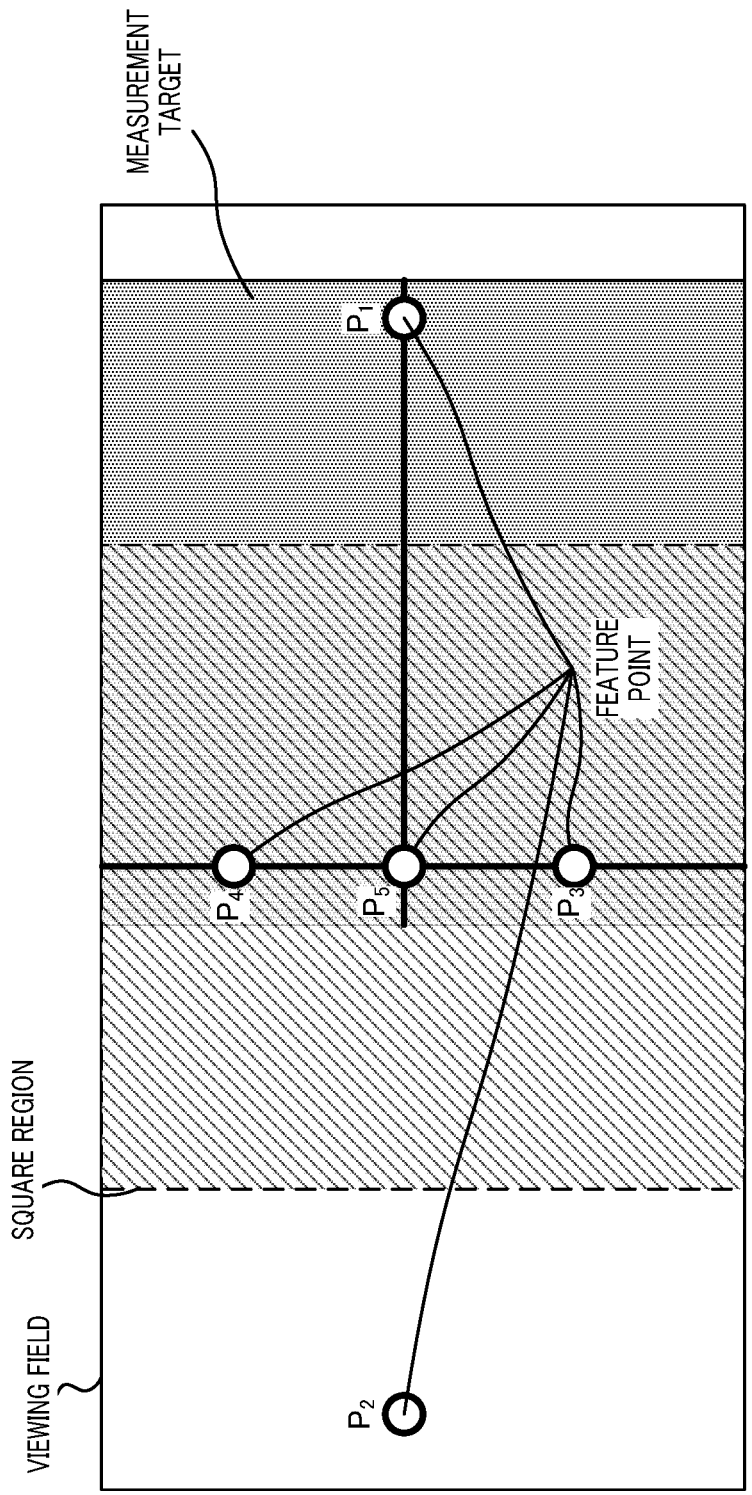
FIG. 12 is a diagram illustrating a disposing example of feature points in a viewing field according to a modified example of Embodiment 2.

According to disposing method 3, a part of the five feature points of laser 15 is disposed within the maximum square region in the viewing field as illustrated in FIG. 12. Feature points $P_1$ and $P_2$ for measuring the dimension of the longer side of the viewing field (in horizontal direction in FIG. 12) are disposed out of the square region according to disposing method 3.

In this case, an aspect ratio of a target within the viewing field measurable by reading apparatus 100 ranges from an aspect ratio (not shown) of a region (rectangular shape) having a vertical length corresponding to a vertical length of the viewing field and a horizontal length corresponding to a length between the adjoining feature points in the horizontal direction ($P_1$ and $P_5$, or $P_2$ and $P_5$) (horizontal length), to an aspect of a region (rectangular shape) having a vertical length corresponding to a length between feature points $P_4$ and $P_5$ (or feature points $P_3$ and $P_5$) (vertical length) and a horizontal length corresponding to the horizontal length of the viewing field.

In case of disposing method 3, even when the measurement target object has a region equivalent to the square region in the viewing field as illustrated in FIG. 12, feature points are disposed at positions closer to both ends of each side in the long-side direction (horizontal direction) of the region of the measurement target object. Moreover, according to disposing method 3, feature points $P_1$ and $P_2$ are disposed in the vicinity of both ends of the viewing field in the long-side direction (horizontal direction) of the viewing field as illustrated in FIG. 12. In this case, the feature points are disposed at positions closer to both ends of each side in the long-side direction (horizontal direction) of the region of the measurement target object even when an image of a horizontally long measurement target object is captured within the viewing field. Accordingly, reading apparatus 100 achieves accurate measurement of dimensions of a measurement target object having either a square shape or a horizontally long shape.

According to disposing method 3, the user is only required to adjust the position of reading apparatus 100 such that the measurement target object becomes horizontally long in the viewing field in FIG. 12, and that the vertically adjoining feature points (feature points $P_3$ and $P_5$ or $P_4$ and $P_5$) are disposed in the vicinity of upper and lower two sides of the measurement target object, for example. In other words, reading apparatus 100 can simultaneously measure lengths of two sides when at least the four feature points (i.e., feature point $P_5$ and any other three feature points) of five feature points $P_1$ through $P_5$ are disposed within the region of the measurement target object.

Description of disposing methods 1 through 3 is now completed. Positions of feature points formed by laser 15 are not limited to the positions illustrated in the specific examples in FIGS. 4A, 4B, 7, 10A, 11A, and 12.

When two feature points for measuring a length of a side in the x direction are disposed, for example, either one of the two feature points for measuring the length of the side in the x direction may be used as one of two feature points for measuring a length of each side in the y direction. For example, feature points $P_1$ and $P_2$ may be disposed in the x direction, while feature points $P_1$ and $P_3$ may be disposed in the y direction. In this case, feature points $P_1$ through $P_3$ are disposed in an L shape (not shown).

As described above, an aspect ratio of a measurable target (surface of rectangular parallelepiped) by reading apparatus 100 is determined in accordance with positions of feature points within the viewing field. Accordingly, reading apparatus 100 may have a function for guiding the user to position reading apparatus 100 appropriately for a measurement target object in accordance with positions of feature points within the viewing field, for example.

In addition, reading apparatus 100 may switch positions of feature points described above in accordance with a shape of a measurement target object.

Description of the respective embodiments according to the present disclosure is now completed.

(Other Embodiments)

(1) According to the embodiments described herein, reading apparatus 100 performs measurement in such a measurable state that a line connecting feature points of laser 15 in the viewing field of imaging sensor 10A becomes parallel with sides of a measurement target object. However, the measurable state for reading apparatus 100 is not limited to this state.

For example, reading apparatus 100 may measure dimensions of a measurement target object when a line connecting two feature points is inclined to sides of the measurement target object.

More specifically, when a line connecting two feature points is not parallel with a side corresponding to a measurement target of a measurement target object, reading apparatus 100 (dimension measurement section 30) may correct a length of the measurement target object on the line connecting the two feature points (i.e., measurement result) in accordance with the inclination of the line connecting the two feature points to the sides of the measurement target to calculate the length of the side of the measurement target.

Figure 13A:
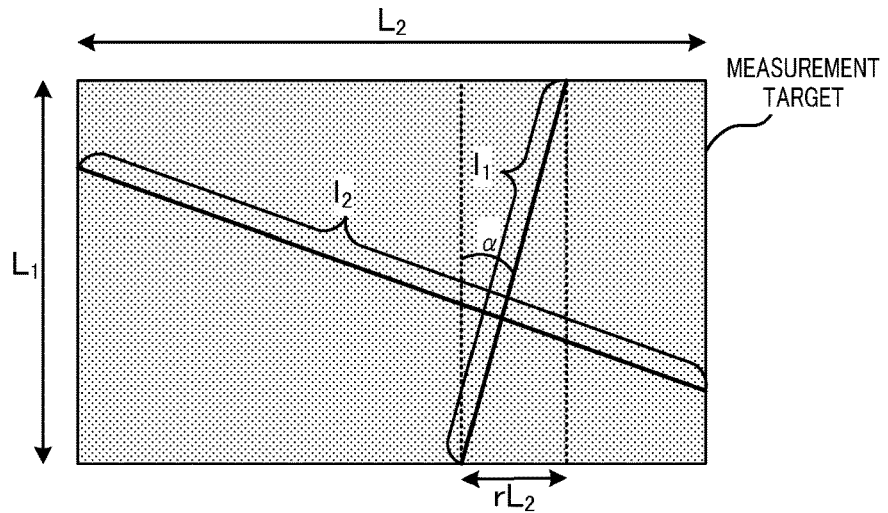
FIGS. 13A and 13B are diagram illustrating an example of a process for correcting dimensions according to another embodiment.
Figure 13B:
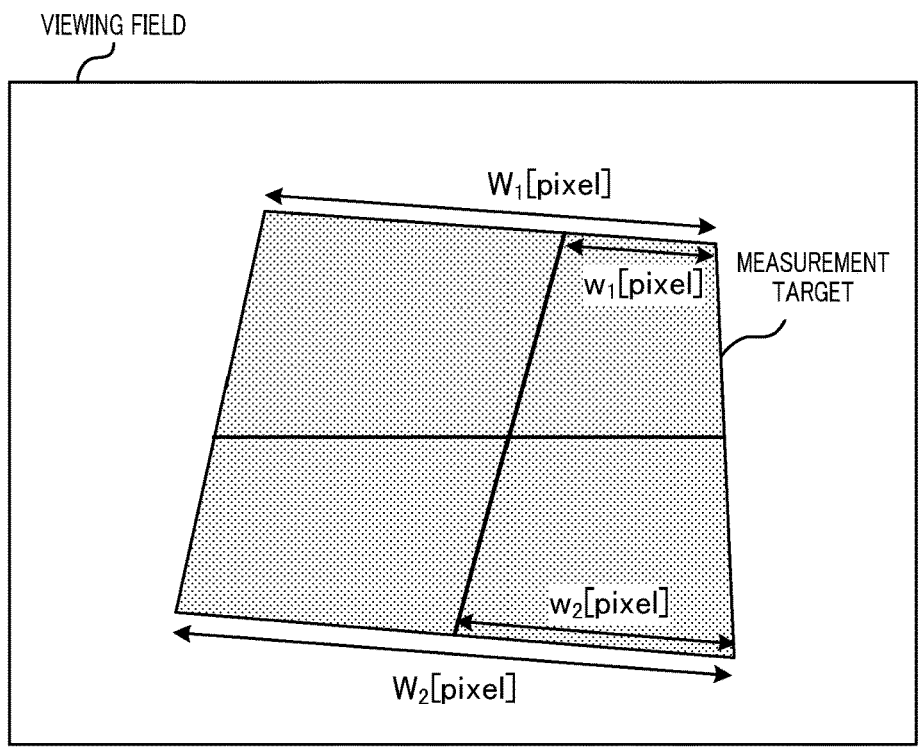

FIGS. 13A and 13B are diagrams illustrating an example of a dimension correction process.

FIG. 13A illustrates a measurement target object which includes one surface having an actual vertical length of $L_1$ and an actual horizontal length $L_2$. Reading apparatus 100 calculates a vertical length $l_1$ and a horizontal length $l_2$ in two directions orthogonal to each other to obtain a measurement result. It is assumed herein that a line (line connecting two feature points) on the measurement target object measured by reading apparatus 100 has an inclination α to a side of the measurement target object. In this case, reading apparatus 100 corrects lengths $l_1$ and $l_2$ by using following equations 6 and 7 to calculate lengths $L_1$ and $L_2$ of the sides of the measurement target object.

[6]
$$L_1 = l_1 \cos \alpha \quad (6)$$

[7]
$$L_2 = l_2 \cos \alpha \quad (7)$$

In this case, cos α is expressed by following equation 8.

[8]
$$\cos \alpha = 1/\sqrt{1+\tan^2 \alpha} \quad (8)$$

In addition, α in equation 7 is expressed by following equation 9.

[9]
$$\tan \alpha = \frac{rL_2}{L_1} = \frac{rl_2 \cos \alpha}{l_1 \cos \alpha} = \frac{rl_2}{l_1} \quad (9)$$

In addition, r in equation 9 is expressed by following equation 10.

[10]
$$r = \left| \frac{w_1}{W_1} - \frac{w_2}{W_2} \right| \quad (10)$$

Accordingly, reading apparatus 100 is only required to measure $w_1$, $w_2$, $W_1$, and $W_2$ (number of pixels [pixel]) in a captured image as illustrated in FIG. 13B.

In this manner, reading apparatus 100 can measure dimensions of a measurement target object even when a line connecting two feature points is not parallel with a side corresponding to a measurement target of the measurement target object.

(2) According to the embodiments described herein, two feature points of laser 15 are disposed in a direction corresponding to a measurement target. However, reading apparatus 100 can measure a length of a side of a measurement target object even when one feature point of laser 15 is disposed in the direction corresponding to the measurement target. For example, reading apparatus 100 can measure a length of a side of a measurement target object on the basis of a viewing angle when one feature point is formed on the measurement target object in a state that a surface of the measurement target object is perpendicular to the imaging optical axis of reading apparatus 100 and that the side of the measurement target lies within the viewing field. Reading apparatus 100 may determine that one surface corresponding to a measurement target of the measurement target object is perpendicular to the imaging optical axis of reading apparatus 100 when the one surface of the measurement target within the captured image has an angle of 90 degrees for all of four angles in a state that the one surface lies within the viewing field.

For example, when two feature points are difficult to form within a region of a measurement target object in the viewing field of imaging sensor 10A, reading apparatus 100 may measure a length of a side of the measurement target object by using one of the feature points formed within the region of the measurement target object. More specifically, when two feature points are contained in the region of the measurement target object in the viewing field, reading apparatus 100 may select the method using two feature points as the dimension measuring method. When not two feature points but only one feature point is contained in the region of the measurement target object in the viewing field, reading apparatus 100 may select the method using one feature point as the dimension measuring method.

Figure 14:
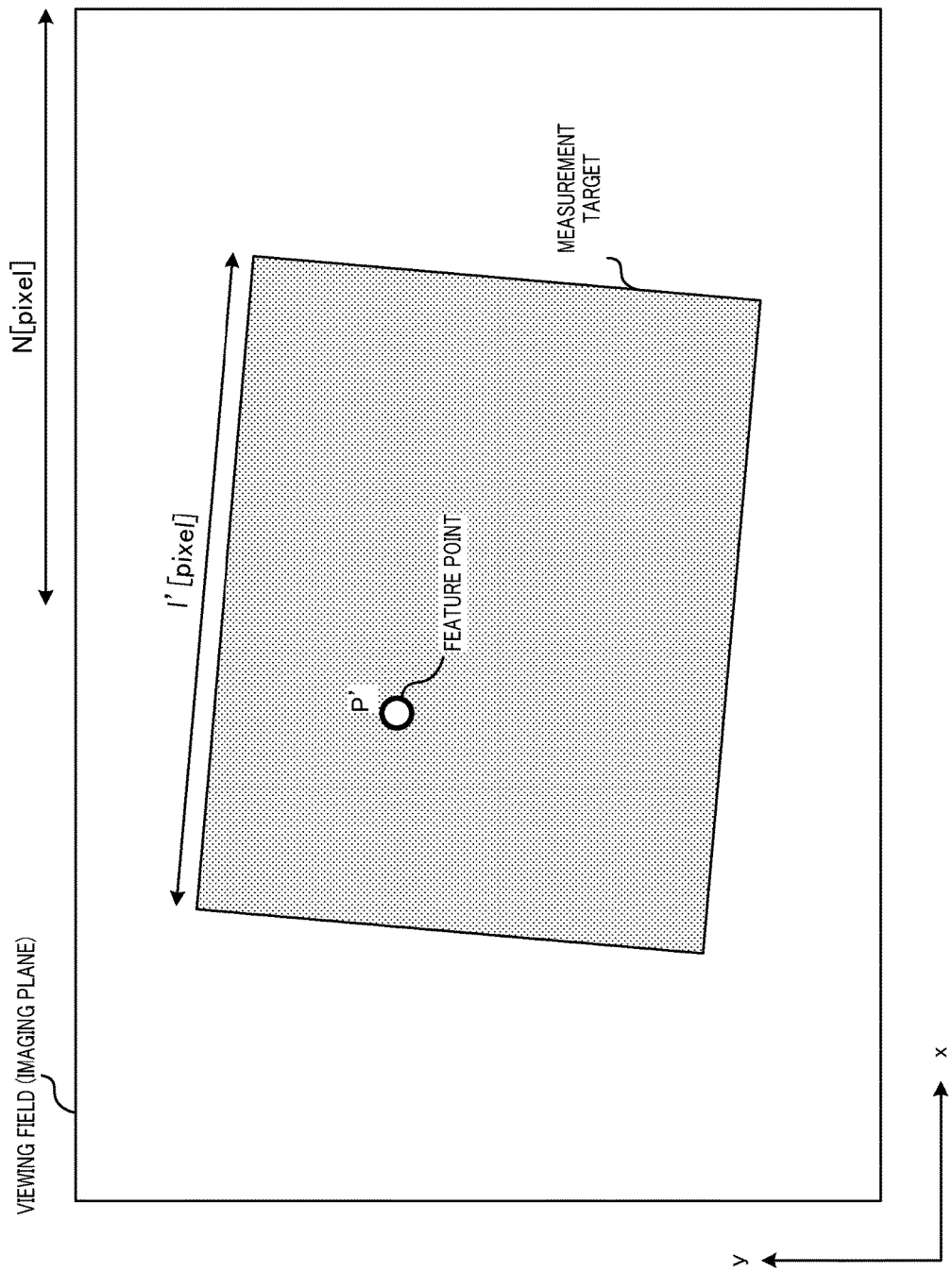
FIG. 14 is a diagram illustrating an example of a measurement target formed in a viewing field (imaging plane) according to a further embodiment.

Hereinafter described is an example of a method for calculating length l of a side of an actual measurement target object corresponding to length l' of the side of the measurement target object by using one feature point P' formed within the viewing field (imaging plane) as illustrated in FIG. 14.

Figure 15:
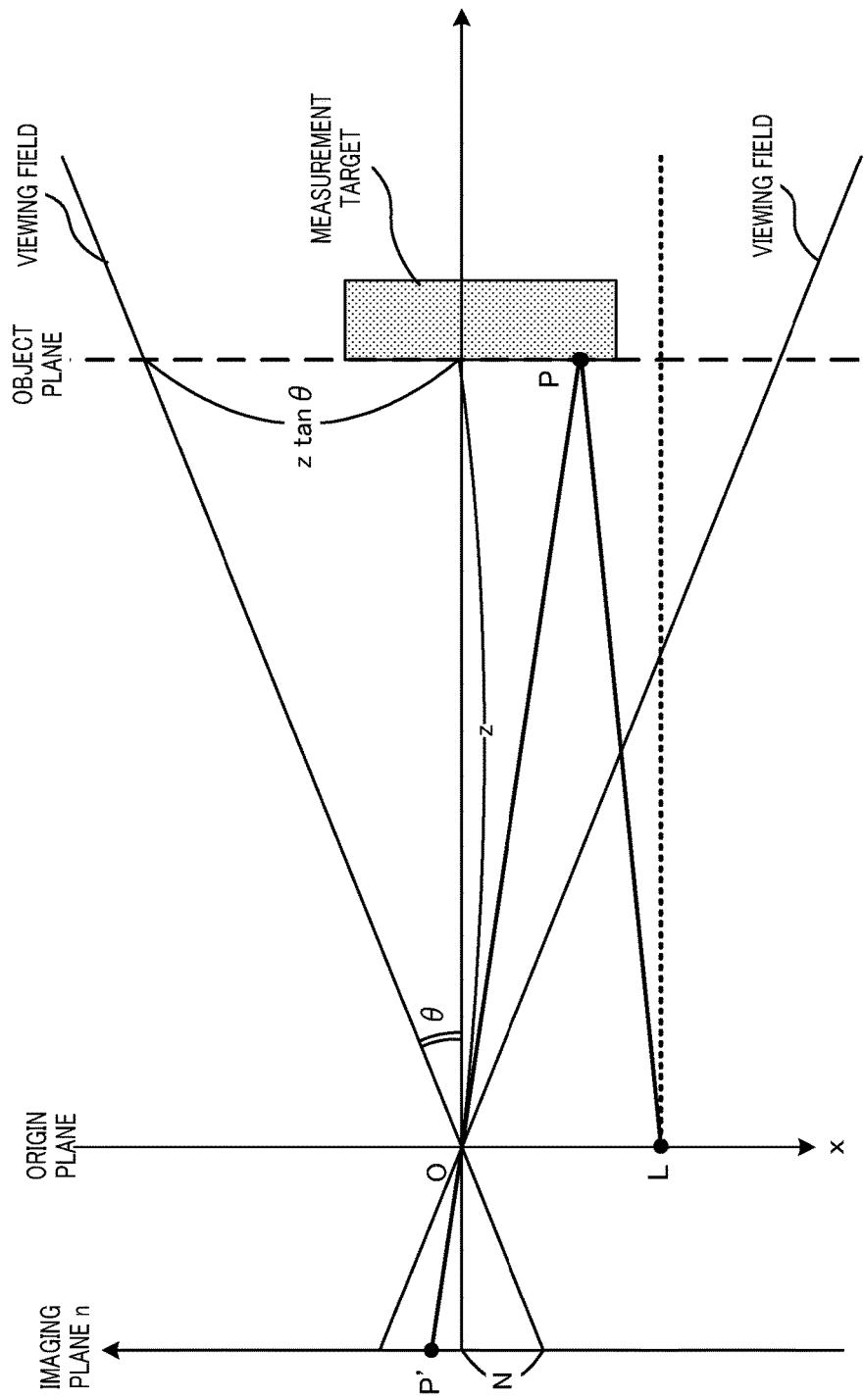
FIG. 15 is a diagram illustrating a method for calculating a length from one feature point according to the further embodiment.

FIG. 15 illustrates a method for calculating length l of the side of the actual measurement target object corresponding to the length (1' in imaging plane) of the side of the measurement target object illustrated in FIG. 14 by using feature point P formed on the measurement target object and produced by laser 15 including at least one light source (L).

It is assumed that the principal point of lens 10B is origin O, and that the plane perpendicular to imaging optical axis z and containing origin O is an "origin plane" in FIG. 15. In addition, the plane perpendicular to imaging optical axis z and containing feature point P is referred to as an "object plane". In FIG. 15, L indicates a position of laser 15 (light source).

Moreover, z indicates a distance between the origin plane and the object plane, and is obtained by the distance measuring process performed by reading apparatus 100.

Furthermore, θ indicates a half angle of view in the viewing field in the horizontal direction, while N indicates a half horizontal length of the viewing field in the imaging plane. In this case, θ and N are known constants.

In FIG. 15, length N in the imaging plane becomes a length z tan θ in the object plane in accordance with a similarity relation between the object plane and the imaging plane. Accordingly, when the length of the side of the measurement target object in the imaging plane is l', actual length l of the side of the measurement target object in the object plane is calculated by following equation 11.

[11]

$$l = \frac{l'}{N} z \tan\theta \qquad (11)$$

As apparent from equation 11, reading apparatus 100 (dimension measurement section 30) can measure actual length l of the measurement target object by using one feature point P on the basis of distance z from the measurement target object obtained by distance measurement performed by laser 15, and known constants θ and N.

When a rectangular plane corresponding to a measurement target of the measurement target object faces in a random direction, the length of the rectangular shape of the measurement target is difficult to obtain by reading apparatus 100 on the basis of one feature point P. Accordingly, reading apparatus 100 herein determines whether or not the rectangular plane of the measurement target is present in the object plane (for example, see FIG. 15) (whether or not measurement is allowed). When the rectangular plane of the measurement target is present in the object plane, reading apparatus 100 measures the length of the rectangular shape by adopting the foregoing method (equation 11 and others).

Figure 16:
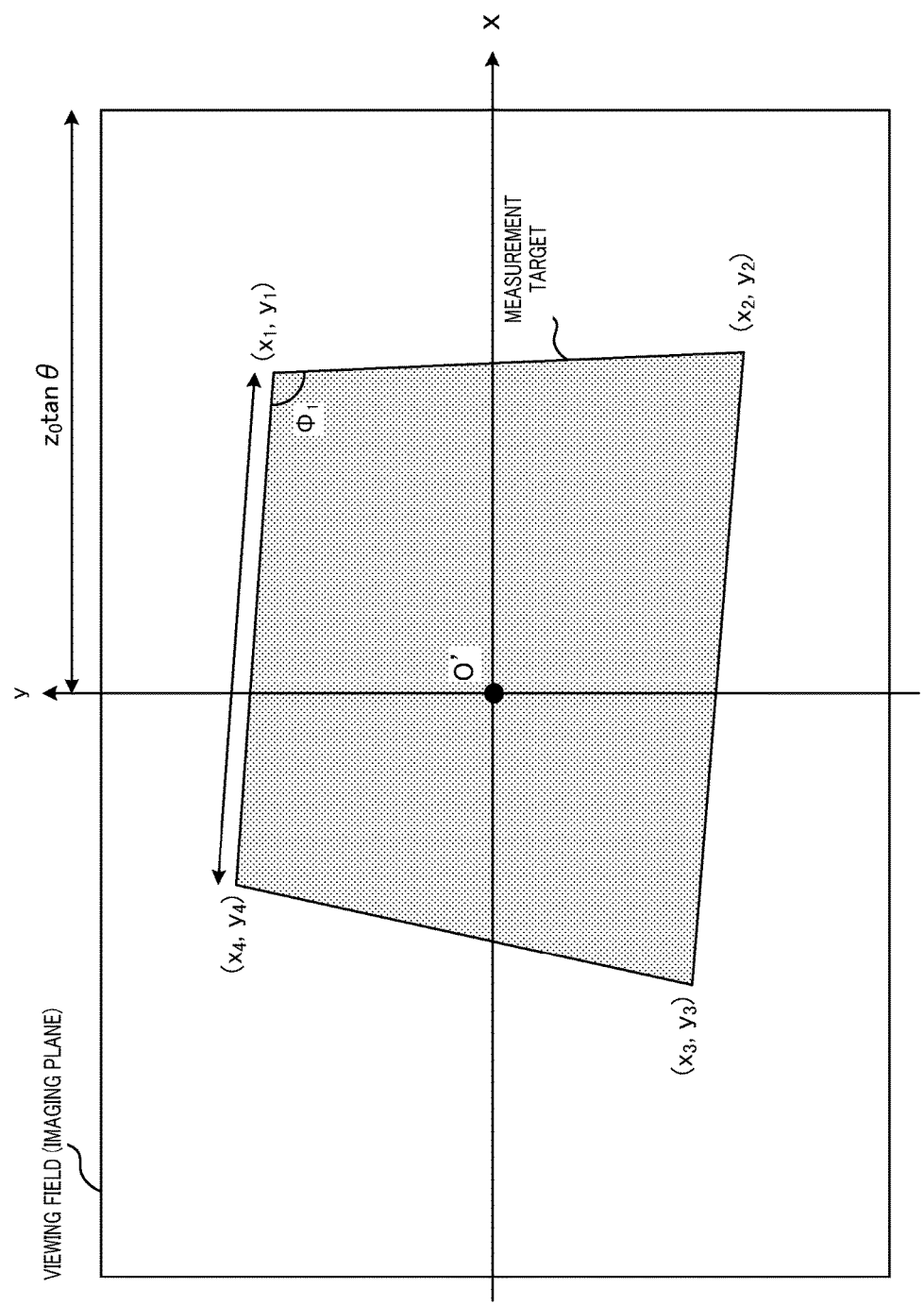
FIG. 16 is a view illustrating a method for determining whether or not measurement is allowed according to a still further embodiment.

Described hereinafter is an example of a method for determining a measurement target object formed within the viewing field (imaging plane) as illustrated in FIG. 16.

In FIG. 16, it is assumed that respective coordinates of the rectangular shape corresponding to a measurement target in the object plane are expressed as $(x_i, y_i)$ (i=1 through 4) when the plane of the rectangular shape in an object plane at distance $z_0$ is located as illustrated in FIG. 16 in a state that distance $z_0$ is a distance from an intersection O' of the rectangular plane and imaging optical axis z (distance between origin plane O and object plane O').

Figure 17:
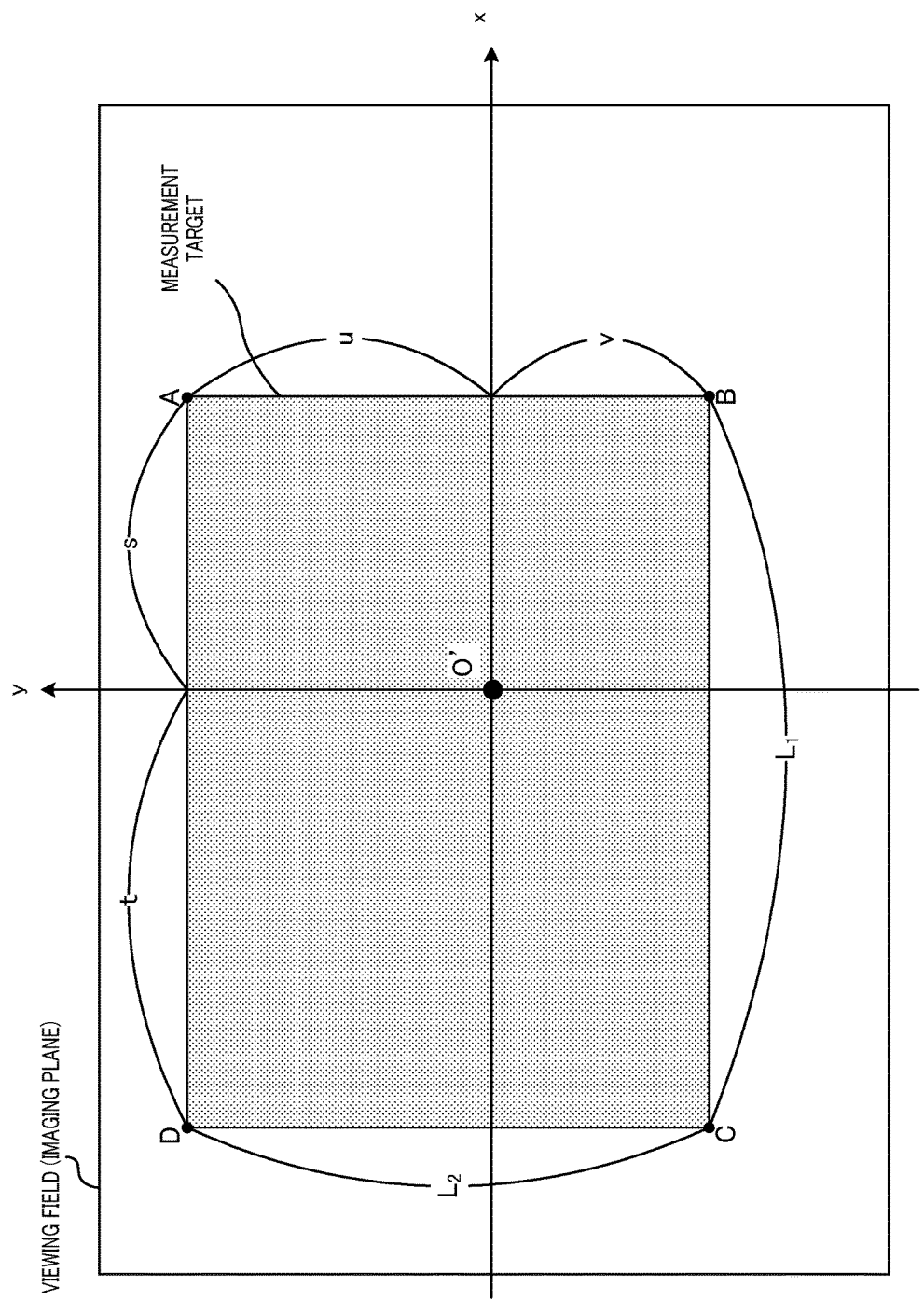
FIG. 17 is a view illustrating the method for determining whether or not measurement is allowed according to the still further embodiment.

In this case, the coordinates $(x_i, y_i)$ can be expressed as coordinates of a rectangular shape $L_1 \times L_2$ located in the object plane and rotated around the y-axis α times, around the z-axis β times, and around the y-axis γ times as illustrated in FIG. 17. Each of s, t, u, and v in FIG. 17 indicates a ratio of divisions of the rectangular shape $L_1 \times L_2$ located in the object plane along a center O' of the viewing field prior to rotation.

In this case, $(x_i, y_i)$ is expressed by following equation 12.

[12]

$$x_i = \frac{z_0 X_i}{z_0 + Z_i}$$

$$y_i = \frac{z_0 Y_i}{z_0 + Z_i} \qquad (12)$$

In equation 12, $X_i$, $Y_i$, and $Z_i$ are expressed by following equation 13.

$$\begin{pmatrix} X_i \\ Y_i \\ Z_i \end{pmatrix} = \begin{pmatrix} (\Box L_1 \cos\alpha\cos\beta - \Delta L_2 \sin\beta)\cos\gamma - \Box L_1 \sin\alpha\sin\gamma \\ \Box L_1 \cos\alpha\sin\beta + \Delta L_2 \cos\beta \\ -(\Box L_1 \cos\alpha\cos\beta - \Delta L_2 \sin\beta)\sin\gamma - \Box L_1 \sin\alpha\cos\gamma \end{pmatrix} \qquad (13)$$

When i=1, □→s Δ→u.
When i=2, □→s Δ→−v.
When i=3, □→−t Δ→−v.
When i=4, □→−t Δ→u.

In this case, an angle $\varphi_i$ illustrated in FIG. 16 is expressed by following equation 14.

[14]

$$\cos\phi_1 = \frac{\Delta_{X21}\Delta_{X41} + \Delta_{Y21}\Delta_{Y41}}{\sqrt{(\Delta_{X21})^2 + (\Delta_{Y21})^2} \sqrt{(\Delta_{X41})^2 + (\Delta_{Y41})^2}} \qquad (14)$$

In equation 14, $\Delta_{Ujk}$ is expressed by following equation 15.

[15]

$$\Delta_{Ujk} = (U'_j - U'_k) + (U'_j Z'_k - U'_k Z'_j) \qquad (15)$$

In this case, U is X or Y, j and k range from 1 to 4, and $X_i' = (X_i/z_0)$, $Y_i' = (Y_i/z_0)$, and $Z_i' = (Z_i/z_0)$ hold.

Accordingly, $\varphi_1$ is a function of $L_1/z_0$, $L_2/z_0$, α, β, and γ.

The object plane and the imaging plane have a similarity relation, wherefore reading apparatus 100 can directly obtain $\varphi_i$ in the object plane from an image in the imaging plane. Accordingly, reading apparatus 100 can limit the values of α, β, and γ (i.e., rotations (directions) of measurement target object) by limiting the value of $\varphi_i$ for dimension measurement to a predetermined range on the basis of the relationships expressed in equations 12 through 15. The relationships between the range of $\varphi_i$ and the values of α, β, and γ may be obtained beforehand.

More specifically, reading apparatus 100 measures the length of the rectangular shape by adopting the foregoing method (equation 11 and others) when $\varphi_1$ lies within the predetermined range. For example, reading apparatus 100 may be so controlled as to measure the length of the rectangular shape when $\varphi_1$ lies within a range from 89 degrees to 91 degrees (i.e., within range of 1 degree above or below right angle (90 degrees)), but not to measure the length of the rectangular shape when $\varphi_1$ is out of the range from 89 degrees to 91 degrees. In this manner, reading apparatus 100 can measure dimensions while reducing measurement errors produced by rotation of the measurement target object.

Figure 18:
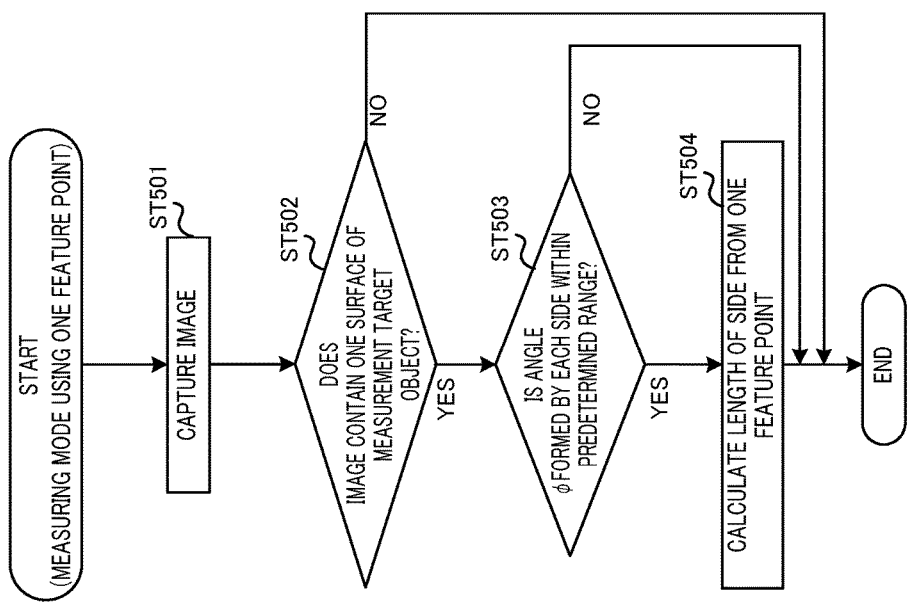
FIG. 18 is a flowchart illustrating a flow of a dimension measuring operation performed by a reading apparatus according to a still further embodiment.

FIG. 18 is a flowchart illustrating a flow of an operation performed by reading apparatus 100 in a mode for measuring dimensions of a measurement target object on the basis of one feature point.

For example, the operation illustrated in FIG. 18 may be performed together with the mode for measuring dimensions of a measurement target object on the basis of two feature points described in Embodiment 1 (for example, see FIG. 6B and other figures), or Embodiment 2 (for example, see FIG. 9B and other figures). For example, reading apparatus 100 may switch the mode between the measuring mode using one feature point (FIG. 18) and the measuring mode using two feature points (FIG. 6B or FIG. 9B) in accordance with the number of feature points (one or a plurality of feature points) contained in a captured image.

For example, the operation illustrated in FIG. 18 starts when reading apparatus 100 determines to start the measuring mode using one feature point.

Reading apparatus 100 in FIG. 18 captures an image containing a measurement target object by using imaging sensor 10A (ST 501).

Thereafter, reading apparatus 100 determines whether or not one surface of the measurement target object is contained in the captured image (imaging plane) (ST502). When one surface of the measurement target object is not contained in the image (ST 502: NO), reading apparatus 100 ends the process illustrated in FIG. 18.

When one surface of the measurement target object is contained in the image (ST 502: YES), reading apparatus 100 determines whether or not angle φ (e.g., $φ_1$ in FIG. 16) formed by respective sides of the one surface of the measurement target object lies within a predetermined range (ST 503). When angle φ is out of the predetermined range (S 503: NO), reading apparatus 100 ends the process illustrated in FIG. 18.

When angle φ lies within the predetermined range (ST 503: YES), reading apparatus 100 calculates lengths of sides of the measurement target object on the basis of one feature point as described above (ST 504).

(3) According to the embodiments described herein, reading apparatus 100 measures a volume of a measurement target object as an example of dimensions of the measurement target object. However, dimensions calculated by reading apparatus 100 is not limited to a volume, but may be a sum of three sides of a rectangular parallelepiped (length, width, and height).

(4) According to the embodiments described herein, reading apparatus 100 performs both the information reading process and the dimension measuring process. However, the apparatus illustrated in FIG. 1 may be a dimension measuring apparatus constituted by configurations performing only the dimension measuring process (i.e., configurations not associated with information reading function).

INDUSTRIAL APPLICABILITY

The present invention is suitable for a system which measures dimensions of a measurement target object.

REFERENCE SIGNS LIST

10 Imaging section
10A Imaging sensor
10B Lens
15 Laser
20 Decoder
21 Distance measurement section
22 Reading section
30 Dimension measurement section
40 Operation section
50 Notification section
100 Information reading apparatus having measuring function
150 Information reading section

The invention claimed is:

1. A dimension measuring apparatus, comprising:
a laser radiator that radiates a laser beam to form at least two feature points on a first surface of a measurement target object;
a decoder that measures a distance from the measurement target object to the dimension measuring apparatus by using reflection light of the laser beam reflected on the measurement target object;
an image sensor that captures an image of the measurement target object to which the laser beam is radiated; and
a dimension measurer that measures a length of the first surface of the measurement target object on a line connecting the at least two feature points based on the distance from the measurement target object to the dimension measuring apparatus, a position of the measurement target object in the image, and positions of the at least two feature points in the image,
wherein the dimension measuring apparatus moves to another position to measure a length of a second surface of the measurement target object.

2. The dimension measuring apparatus according to claim 1, wherein:
the measurement target object is a rectangular parallelepiped, and
the dimension measurer measures respective lengths of three sides of the rectangular parallelepiped to calculate a volume of the rectangular parallelepiped from the lengths of the three sides.

3. The dimension measuring apparatus according to claim 1, wherein:
the laser radiator radiates the laser beam to simultaneously form the at least two feature points in each of a first direction and a second direction orthogonal to the first direction within a viewing field of the imaging section, and
the dimension measurer measures each of a length of the measurement target object on a line connecting the at least two feature points formed in the first direction, and a length of the measurement target object on a line connecting the at least two feature points formed in the second direction.

4. The dimension measuring apparatus according to claim 3, wherein:
the measurement target object is a rectangular parallelepiped, and
the dimension measurer measures lengths in the first direction and the second direction for each of at least two surfaces of the rectangular parallelepiped to calculate a volume of the rectangular parallelepiped from the lengths measured for the at least two surfaces, the at least two surfaces of the rectangular parallelepiped includes the first surface and the second surface.

5. The dimension measuring apparatus according to claim 3, wherein:
the number of the feature points formed in the first direction and the second direction is five in total, and
one of the feature points is formed at an intersection of a line connecting other two of the feature points formed in the first direction, and a line connecting other two of the feature points formed in the second direction.

6. The dimension measuring apparatus according to claim 3, wherein all the feature points are formed within a square region with each side having a length identical to a short side of the viewing field of the imaging section.

7. The dimension measuring apparatus according to claim 1, wherein, when the line connecting the at least two feature points is not parallel with a side corresponding to a measurement target of the measurement target object, the dimension measurer corrects the length of the measurement target object on the line in accordance with an inclination of the line to the side to calculate a length of the side.

8. The dimension measuring apparatus according to claim 1, wherein:
the dimension measurer measures the length of the measurement target object on the line connecting the at least two feature points when the line connecting the at least two feature points and a side corresponding to a measurement target of the measurement target object are parallel with each other, and the dimension measurer does not measure the length of the measurement target object when the line and the side are not parallel with each other.

9. An information reading apparatus having a measuring function, the apparatus comprising:
- a laser radiator that applies a laser beam to a first surface of an object;
- a decoder that measures a distance from the object to the information reading apparatus by using reflection light of the laser beam reflected on the object;
- an image sensor that captures an image of the object to which the laser beam is radiated, while adjusting a focus in accordance with the distance from the object;
- a code reader that analyzes the image to read information provided on the object; and
- a dimension measurer that measures a length of the first surface of the object based on the image and the distance from the object,
- wherein the information reading apparatus moves to another position to measure a length of a second surface of the object.

10. A dimension measuring method performed by a dimension measuring apparatus, the method comprising:
- radiating a laser beam to form at least two feature points on a first surface of a measurement target object;
- measuring a distance from the measurement target object to the dimension measuring apparatus by using reflection light of the laser beam reflected on the measurement target object;
- capturing an image of the measurement target object to which the laser beam is radiated;
- measuring a length of the first surface of the measurement target object on a line connecting the at least two feature points based on the distance from the measurement target object to the dimension measuring apparatus, a position of the measurement target object in the image, and positions of the at least two feature points in the image; and
- measuring a length of a second surface of the measurement target object by changing a position of the dimension measuring apparatus.

* * * * *